(12) United States Patent
Castelluccio et al.

(10) Patent No.: US 9,932,425 B2
(45) Date of Patent: Apr. 3, 2018

(54) PROCESSES TO CONTROL FOULING AND IMPROVE COMPOSITIONS

(71) Applicant: Dow Global Technologies LLC, Midland, TX (US)

(72) Inventors: Anthony J. Castelluccio, Lake Jackson, TX (US); Jeffrey J. Dean, Madison, AL (US); Alec Y. Wang, Lake Jackson, TX (US); Lindsey A. Clark, Pearland, TX (US); Pradeep Jain, Lake Jackson, TX (US); Roger L. Kuhlman, Lake Jackson, TX (US); Angela N. Taha, Missouri City, TX (US); Larry S. Green, Lake Jackson, TX (US); Gary R. Marchand, Lake Jackson, TX (US); Sean W. Ewart, Pearland, TX (US); Jeffrey A. Sims, Lake Jackson, TX (US); Chris E. Blaschke, Brazoria, TX (US); Brandon Fails, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 471 days.

(21) Appl. No.: 14/569,956

(22) Filed: Dec. 15, 2014

(65) Prior Publication Data
US 2015/0112005 A1    Apr. 23, 2015

Related U.S. Application Data

(62) Division of application No. 12/996,699, filed as application No. PCT/US2009/046596 on Jun. 8, 2009, now Pat. No. 8,933,156.

(60) Provisional application No. 61/073,581, filed on Jun. 18, 2008.

(51) Int. Cl.
| | | |
|---|---|---|
| *C08F 210/14* | (2006.01) | |
| *C08K 5/52* | (2006.01) | |
| *C08K 5/12* | (2006.01) | |
| *C08K 5/17* | (2006.01) | |
| *C08L 23/08* | (2006.01) | |
| *C08F 297/08* | (2006.01) | |
| *C08L 53/00* | (2006.01) | |
| *C08F 6/02* | (2006.01) | |
| *C08K 5/098* | (2006.01) | |
| *C08F 210/16* | (2006.01) | |

(52) U.S. Cl.
CPC .............. *C08F 210/14* (2013.01); *C08F 6/02* (2013.01); *C08F 297/08* (2013.01); *C08F 297/083* (2013.01); *C08K 5/098* (2013.01); *C08K 5/12* (2013.01); *C08K 5/17* (2013.01); *C08K 5/52* (2013.01); *C08L 23/0815* (2013.01); *C08L 53/00* (2013.01); *C08F 210/16* (2013.01); *C08F 2500/03* (2013.01); *C08F 2500/08* (2013.01); *C08F 2500/11* (2013.01); *C08F 2500/12* (2013.01); *C08F 2500/19* (2013.01); *C08F 2500/20* (2013.01); *C08L 2666/02* (2013.01)

(58) Field of Classification Search
CPC ........................................................ C08F 6/02
See application file for complete search history.

(56) References Cited

U.S. PATENT DOCUMENTS

| | | | |
|---|---|---|---|
| 4,762,890 | A | 8/1988 | Strait et al. |
| 4,798,081 | A | 1/1989 | Hazlitt et al. |
| 4,927,888 | A | 5/1990 | Strait et al. |
| 4,950,541 | A | 8/1990 | Tabor et al. |
| 5,414,027 | A | 5/1995 | DeNicola, Jr. et al. |
| 5,464,907 | A | 11/1995 | Jelenic et al. |
| 5,889,099 | A | 3/1999 | Nagai et al. |
| 6,030,917 | A | 2/2000 | Weinberg et al. |
| 6,248,540 | B1 | 6/2001 | Weinberg et al. |
| 6,268,444 | B1 | 7/2001 | Klosin et al. |
| 6,306,658 | B1 | 10/2001 | Turner et al. |
| 6,316,663 | B1 | 11/2001 | Guram et al. |
| 6,362,309 | B1 | 3/2002 | Lund et al. |

(Continued)

FOREIGN PATENT DOCUMENTS

| | | |
|---|---|---|
| EP | 0190889 A2 | 8/1986 |
| EP | 0754711 A1 | 1/1997 |

(Continued)

OTHER PUBLICATIONS

J.C. Randall, "A Review of High Resolution Liquid 13Carbon Nuclear Magnetic Resonance Characterizations of Ethylene-Based Polymers", JMS-Rev. Macromol. Chem. Phys., C29(2&3), 201-317 (1989).

(Continued)

*Primary Examiner* — Melissa A Rioja
(74) *Attorney, Agent, or Firm* — Husch Blackwell LLP

(57) ABSTRACT

Improved reaction processes comprise reacting a mixture to form a product comprising a metal alkyl, metal oxide, or mixture thereof and then passing said product to a post-reactor heat exchanger. The improvement comprises one or more of the following:

(1) reacting said metal alkyl compound with an acid to produce a soluble metal ester; or
(2) adding an ionic surfactant; or
(3) adding a mixture comprising an antioxidant to the product under conditions sufficient to avoid formation of significant amounts of insoluble metal or metal compounds derived from said metal alkyl compound; or
(4) purging said post-reactor heat exchanger with an inert gas under conditions to remove metal oxide from the post-reactor heat exchanger.

13 Claims, 7 Drawing Sheets

(56) References Cited

U.S. PATENT DOCUMENTS

| | | | |
|---|---|---|---|
| 6,395,671 | B2 | 5/2002 | LaPointe |
| 6,667,375 | B1 * | 12/2003 | Mitsuno ............... C08F 210/16 526/234 |
| 7,608,668 | B2 | 10/2009 | Li Pi Shan et al. |
| 2001/0018475 | A1 | 8/2001 | Tominaga et al. |
| 2003/0004286 | A1 | 1/2003 | Klosin et al. |
| 2004/0010103 | A1 | 1/2004 | Boussie et al. |
| 2004/0072957 | A1 | 4/2004 | Terano et al. |
| 2006/0199897 | A1 | 9/2006 | Karjala et al. |
| 2006/0199930 | A1 | 9/2006 | Li Pi Shan et al. |
| 2006/0199931 | A1 | 9/2006 | Poon et al. |
| 2007/0202330 | A1 | 8/2007 | Peng et al. |

FOREIGN PATENT DOCUMENTS

| | | | |
|---|---|---|---|
| EP | 1588843 | A1 | 10/2005 |
| JP | 2004168876 | A | 6/2004 |
| WO | 03040195 | A1 | 5/2003 |
| WO | 2004024740 | A1 | 3/2004 |
| WO | 2005090425 | A1 | 9/2005 |
| WO | 2005090426 | A1 | 9/2005 |
| WO | 2005090427 | A2 | 9/2005 |
| WO | 2006115839 | A1 | 2/2006 |
| WO | 2006101966 | A1 | 9/2006 |
| WO | 2006102150 | A2 | 9/2006 |
| WO | 2007149274 | A2 | 12/2007 |
| WO | 2009012073 | A1 | 1/2009 |

OTHER PUBLICATIONS

L. Wild, "Determination of Branching Distributions in Polyethylene and Ethylene Copolymers", Journal of Polymer Science: Polymer Physics Edition, vol. 20, 441-455 (1982).

T. Williams, "The Construction of a Polyethylene Calibration Curve for Gel Permeation Chromatography Using Polystyrene Fractions", Polymer Letters, vol. 6, pp. 621-624 (1968).

* cited by examiner

PROCESSES TO CONTROL FOULING AND IMPROVE COMPOSITIONS

FIELD OF THE INVENTION

This invention relates to improved processes employing a post-reactor heat exchanger. In particular, the invention relates to (1) reaction processes resulting in less heat exchanger fouling and (2) compositions with improved characteristics, e.g., color.

BACKGROUND AND SUMMARY OF THE INVENTION

Many reaction processes employ heat exchangers in order to transfer heat from one media to another without the media being in direct contact. The heat exchanger may be employed subsequent to the main reaction and in such cases are called post-reactor heat exchangers. Unfortunately, in some situations these post-reactor heat exchangers may become fouled due to impurities, for example, insoluble compounds building up in, for example, coils or tubes of the heat exchanger. The fouling reduces the cross sectional area for heat to be transferred and causes an increase in the resistance to heat transfer across the heat exchanger. This is because the thermal conductivity of the fouling layer is often low. Thus, fouling reduces the overall heat transfer coefficient and efficiency of the heat exchanger. A corresponding increase in pumping and maintenance cost may also result.

Accordingly, what is needed are improved processes which may assist in reducing or eliminating the fouling of equipment such as post-reactor heat exchangers.

Advantageously, improved reaction processes comprise reacting a mixture via a reaction in at least one reactor to form at least one product comprising a metal alkyl compound, metal oxide, or mixture thereof and then passing said product to a post-reactor heat exchanger. The improvement comprises one or more of the following:

(1) reacting said metal alkyl compound with an acid to produce a soluble metal ester; or (2) adding an ionic surfactant to the reactor; or (3) adding a mixture comprising an antioxidant to the product under conditions sufficient to avoid formation of significant amounts of insoluble metal or metal compounds derived from said metal alkyl compound; or (4) purging said post-reactor heat exchanger with an inert gas under conditions to remove metal oxide from the post-reactor heat exchanger.

In another embodiment, the invention relates to novel compositions comprising an ethylene/α-olefin multiblock interpolymer and a metal ester. The ethylene/α-olefin multiblock interpolymers may be characterized before any crosslinking by one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2; \text{ or}$$

(4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81$$

for ΔH greater than zero and up to 130 J/g, $$\Delta T \geq 48° C.$$

for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multiblock interpolymer characteristics (1) through (7) above are given with respect to the ethylene/α-olefin interpolymer before any significant crosslinking, i.e., before crosslinking. The ethylene/α-olefin interpolymers useful in the present invention may or may not be crosslinked depending upon the desired properties. By using characteristics (1) through (7) as measured before crosslinking is not meant to suggest that the interpolymer is required or not required to be crosslinked—only that the characteristic is measured with respect to the interpolymer without significant crosslinking. Crosslinking may or may not change each of these properties depending upon the specific polymer and degree of crosslinking.

DETAILED DESCRIPTION OF THE INVENTION

General Definitions

Figure 1:
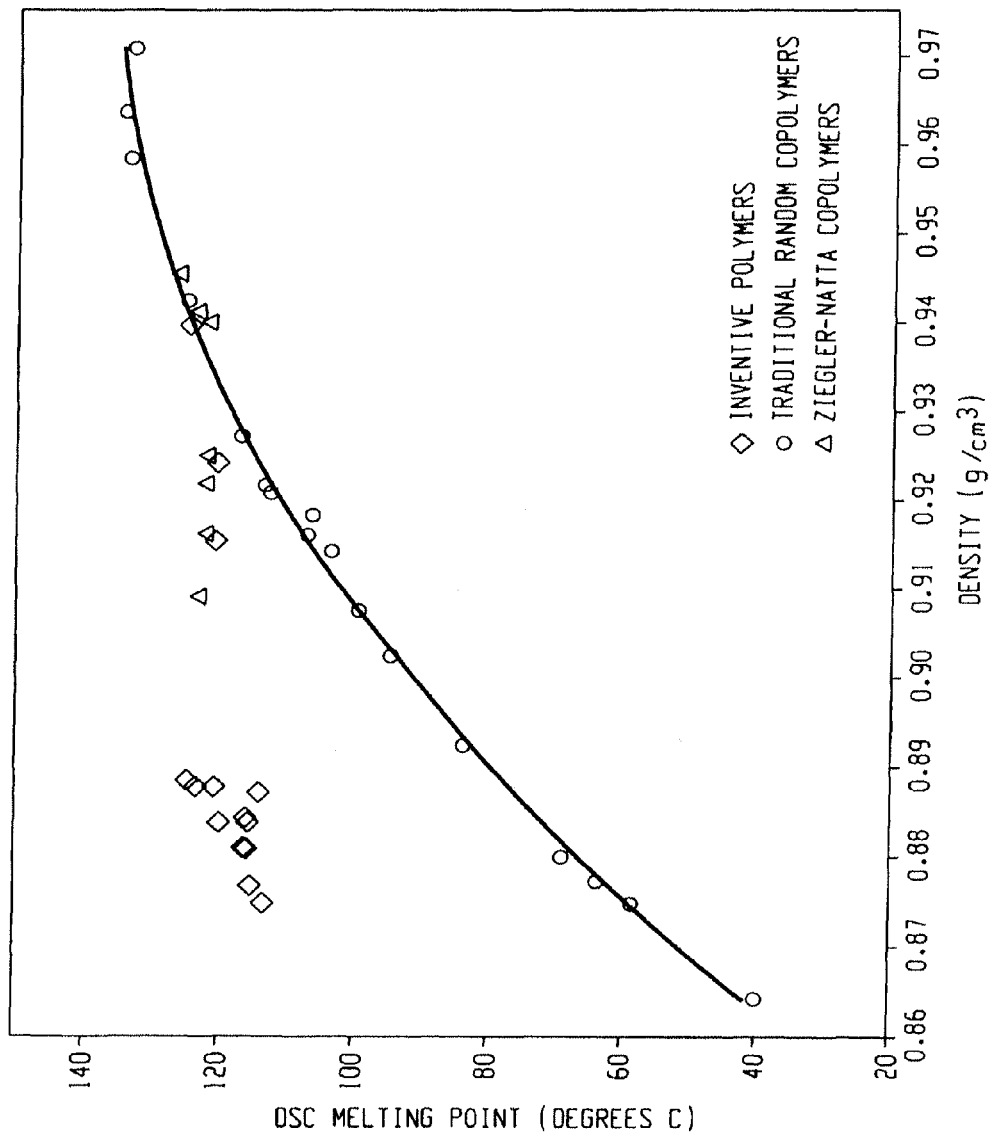
FIG. 1 shows the melting point/density relationship for the inventive polymers (represented by diamonds) as compared to traditional random copolymers (represented by circles) and Ziegler-Natta copolymers (represented by triangles).

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The terms "ethylene/α-olefin block interpolymer" or "ethylene/α-olefin multiblock interpolymer"generally refer to block copolymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin block interpolymers do not include those produced in low yields or in a minor amount or as a by-product of a chemical process. While the ethylene/α-olefin block interpolymers can be blended with one or more polymers, the as-produced ethylene/α-olefin block interpolymers are substantially pure and often comprise a major component of the reaction product of a polymerization process. Such ethylene/α-olefin block interpolymers are described in, for example, U.S. Patent Application Publication No. US 2006/0199930 A1 published on Sep. 7, 2006 and incorporated herein by reference.

The terms "propylene-ethylene interpolymer" or "propylene based plastomers or elastomers (PBPE)" generally refer to copolymers comprising propylene and a monomer such as ethylene. Preferably, propylene comprises the majority mole fraction of the whole polymer, i.e., propylene comprises at least about 70, preferably at least about 80, more preferably at least about 90 mole percent of the whole polymer with a substantial remainder of the whole polymer comprising at least one other comonomer that is preferably ethylene. Suitable propylene-ethylene interpolymers are described in, for example, WO 2006/115839 published on Nov. 2, 2006 and incorporated herein by reference. Suitable propylene-ethylene interpolymers are sold commercially by The Dow Chemical Company as VERSIFY™ and by Exxon as VISTAMAXX™.

"Composition," as used herein, includes a mixture of materials which comprise the composition, as well as reaction products and decomposition products formed from the ingredients or materials of the composition. Specifically included within the compositions of the present invention are grafted or coupled compositions wherein an initiator or coupling agent reacts with at least a portion of one or more polymers and/or at least a portion of one or more fillers.

Unless otherwise stated, for purposes of this application the test methods used are described below or are well-known to one skilled in the art.

Density

Resin density was measured by the Archimedes displacement method, ASTM D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch".

Melt Flow Rate by Extrusion Plastomer

Melt flow rate measurements for polyethylene were performed according to ASTM D-1238-03, Condition 190° C./2.16 kg and Condition 190° C./10.0 kg, which are known as $I_2$ and $I_{10}$, respectively. Melt flow rate measurements for PBPE and/or propylene polymers were performed according to ASTM D-1238-03, Condition 230° C./2.16 kg and Condition 230° C./10.0 kg, which are known as $I_2$ and $I_{10}$, respectively. Melt flow rate is inversely proportional to the molecular weight of the polymer. Thus, the higher the molecular weight, the lower the melt flow rate, although the relationship is not linear. Melt flow rate determinations can also be performed with even higher weights, such as in accordance with ASTM D-1238 Condition 190° C./21.6 kg, and is known as $I_{21}$. Melt Flow Rate Ratio (MFRR) is the ratio of melt flow rate ($I_{10}$) to melt flow rate ($I_2$) unless otherwise specified.

DSC Glass Transition Temperature

Using a DSC TA Instruments model 2010, data was collected and reduced using Universal Analysis software package. Circa 9-mg sample was weight using a Mettler AE 240 analytical balance. Lightweight (ca 25 mg) aluminum pans were employed throughout. The pans were crimped to improve sample/pan contact. The below steps were employed:
Equilibrate at 40° C.
Ramp 10.00° C./min to 250.00° C.
Air cool: on
Ramp 20.00° C./min to 40.00° C.
Equilibrate at 40.00° C.
Air cool: Off
Ramp 10.00° C./min to 250.00° C.
Data storage: Off
Air cool: On
Ramp 20.00° C./min to 30.00° C.
Air cool: Off The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

$$(AB)_n$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

The term "multi-block copolymer" or "segmented copolymer" refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of both polydispersity index (PDI or Mw/Mn), block length distribution, and/or block number distribution due to the unique process making of the copolymers. More specifically, when produced in a continuous process, the polymers desirably possess PDI from 1.7 to 2.9, preferably from 1.8 to 2.5, more preferably from 1.8 to 2.2, and most preferably from 1.8 to 2.1. When produced in a batch or semi-batch process, the polymers possess PDI from 1.0 to 2.9, preferably from 1.3 to 2.5, more preferably from 1.4 to 2.0, and most preferably from 1.4 to 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

(A) Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -6553.3 + 13735(d) - 7051.7(d)^2; \text{ or}$$

$$T_m > -2002.9 + 4538.5(d) - 2422.2(d)^2,$$

and preferably $$T_m \geq -6288.1 + 13141(d) - 6720.3(d)^2,$$

and more preferably $$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
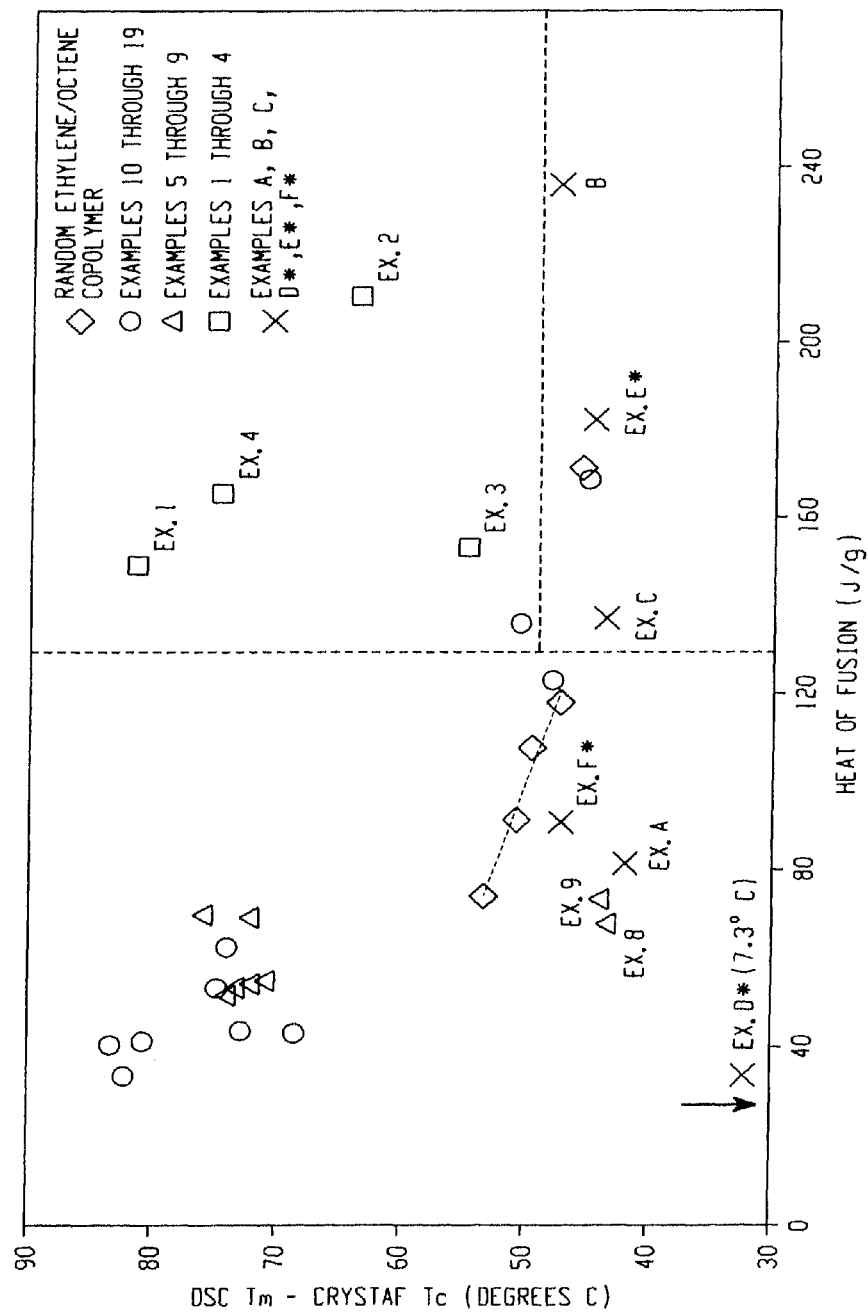
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81,$$

and preferably $$\Delta T \geq -0.1299(\Delta H) + 64.38,$$

and more preferably $$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation $\Delta T = -0.1299(\Delta H) + 62.81$.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d);$$

and preferably $$Re \geq 1491 - 1629(d);$$

and more preferably $$Re \geq 1501 - 1629(d);$$

and even more preferably $$Re \geq 1511 - 1629(d).$$

Figure 3:
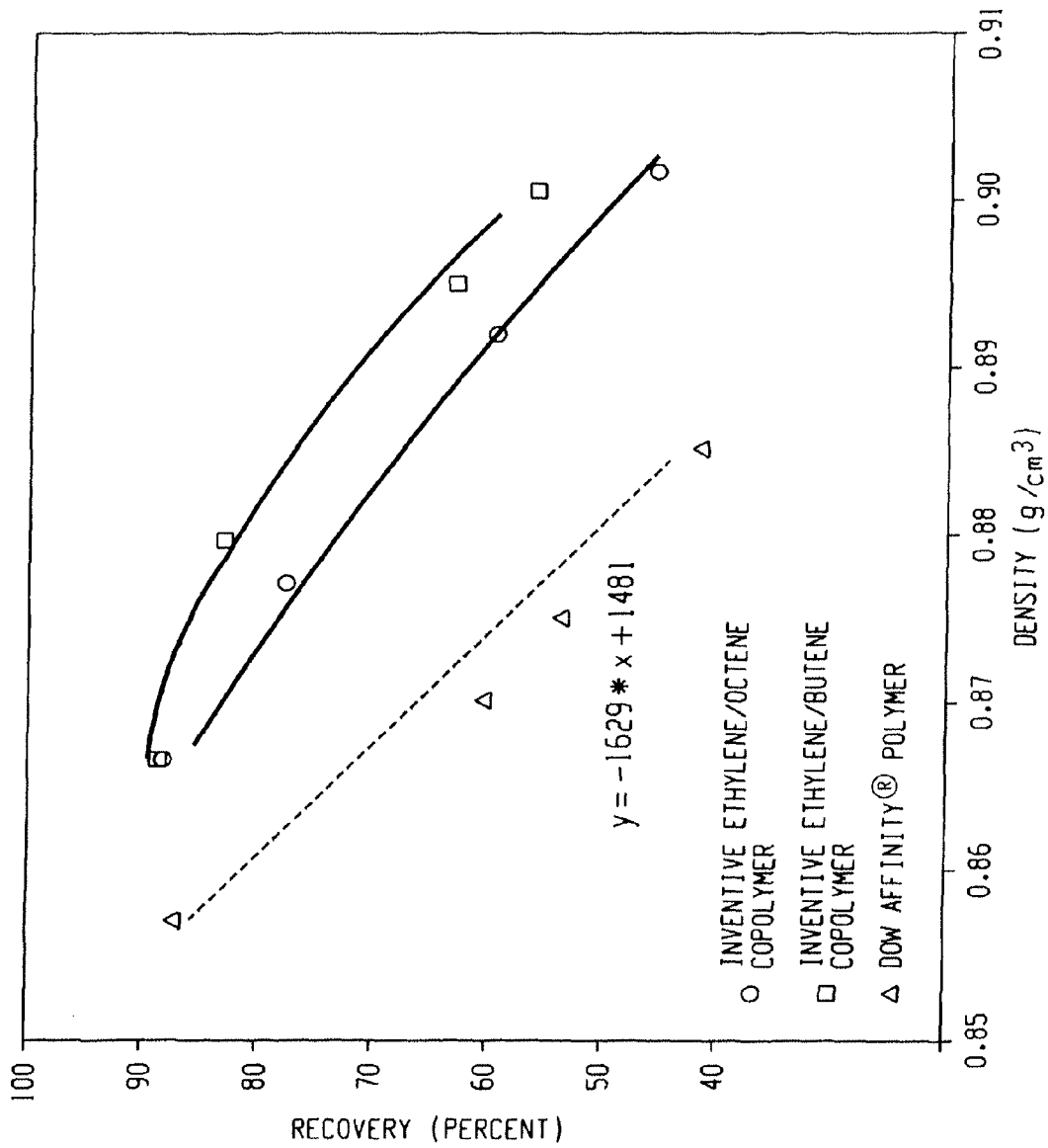
FIG. 3 shows the effect of density on elastic recovery for unoriented films made from inventive interpolymers(represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≥11 MPa, more preferably a tensile strength≥13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more preferably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

Figure 4:
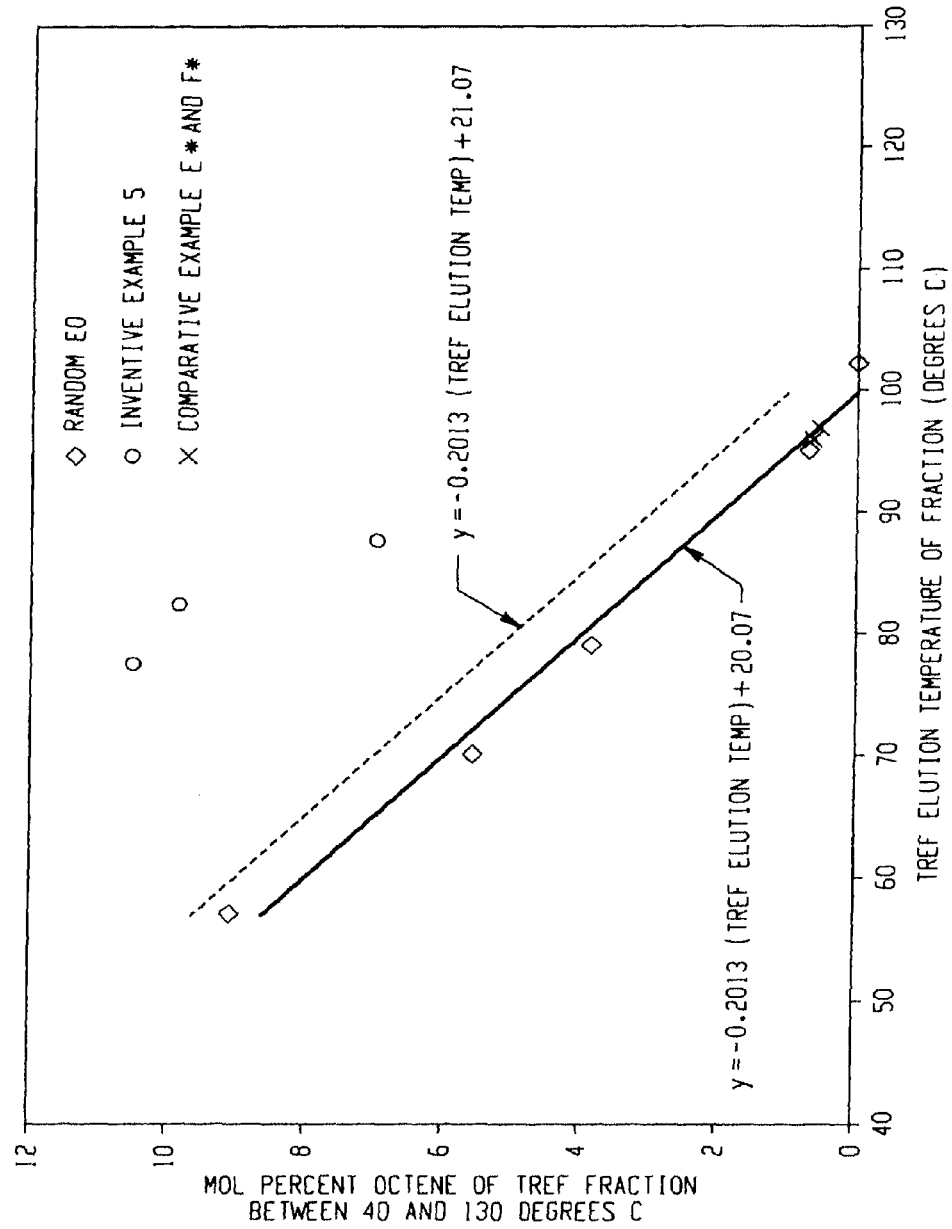
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013) T+20.07 (solid line). The line for the equation (−0.2013) T+21.07 is depicted by a dotted line. Also depicted are the comonomer contents for fractions of several block ethylene/1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
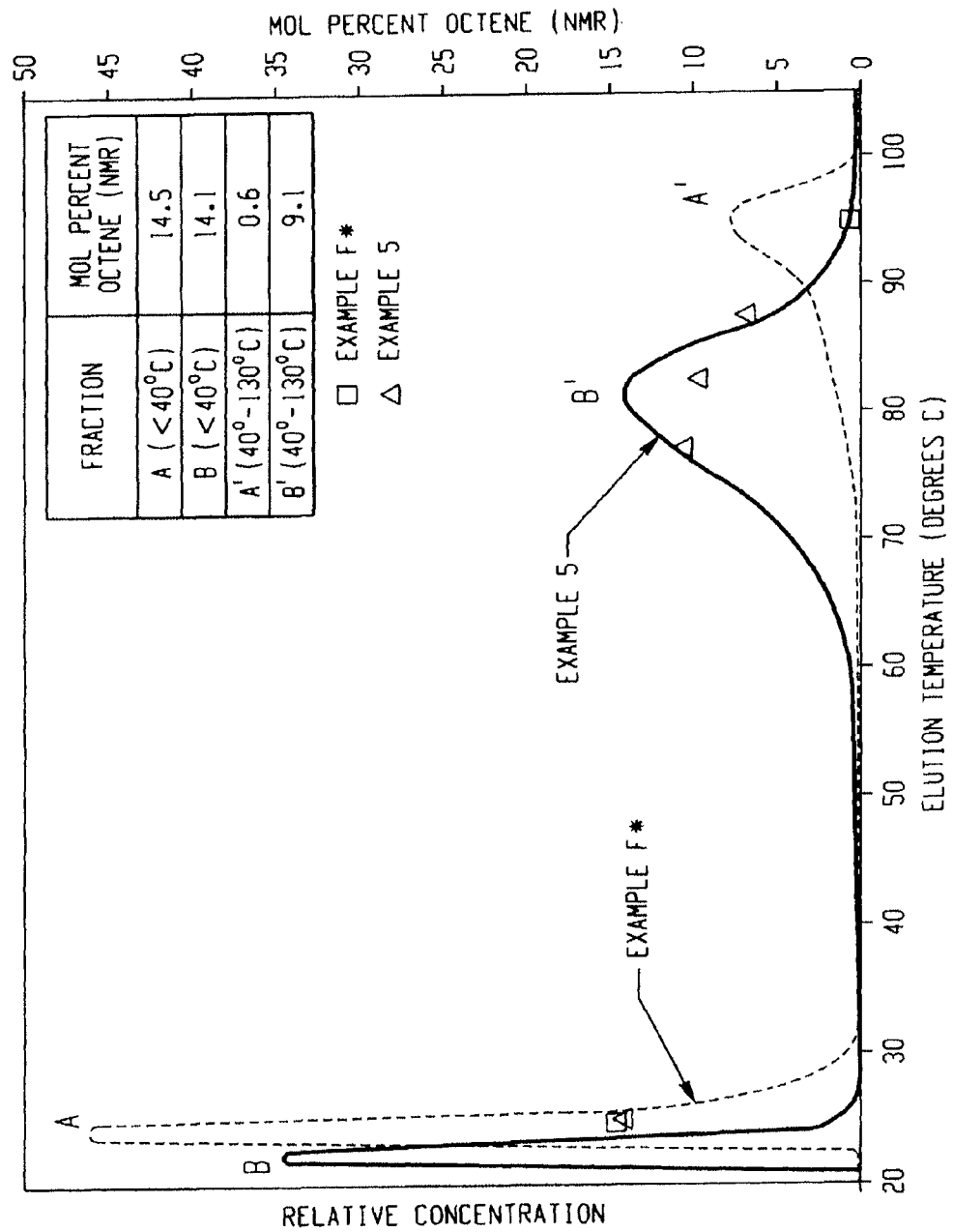
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin, especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.1356) T+13.89, more preferably greater than or equal to the quantity (−0.1356) T+14.93, and most preferably greater than or equal to the quantity (−0.2013) T+21.07, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity (−0.2013) T+20.07, more preferably greater than or equal to the quantity (−0.2013) T+21.07, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mole percent comonomer, has a DSC melting point that corresponds to the equation:

$$Tm \geq (-5.5926)(\text{mole percent comonomer in the fraction})+135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(\text{ATREF elution temperature in Celsius})-136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(\text{ATREF elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infrared detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $Ln P_X = \alpha/T_{XO} + 1$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Further, the inventive polymers can have, alone or in combination with any other properties disclosed herein, a storage modulus, G', such that log(G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C.

Figure 6:
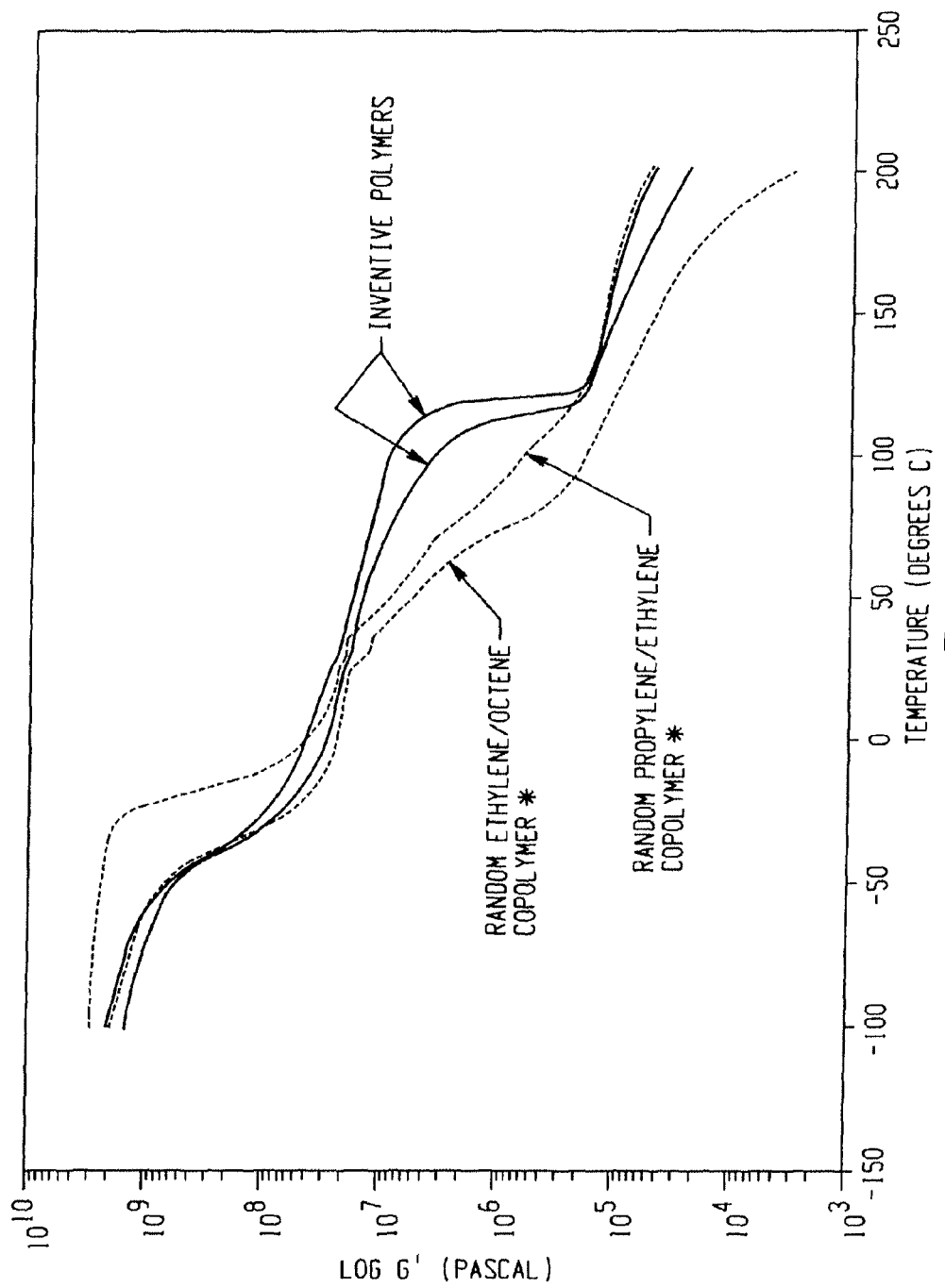
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

(illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
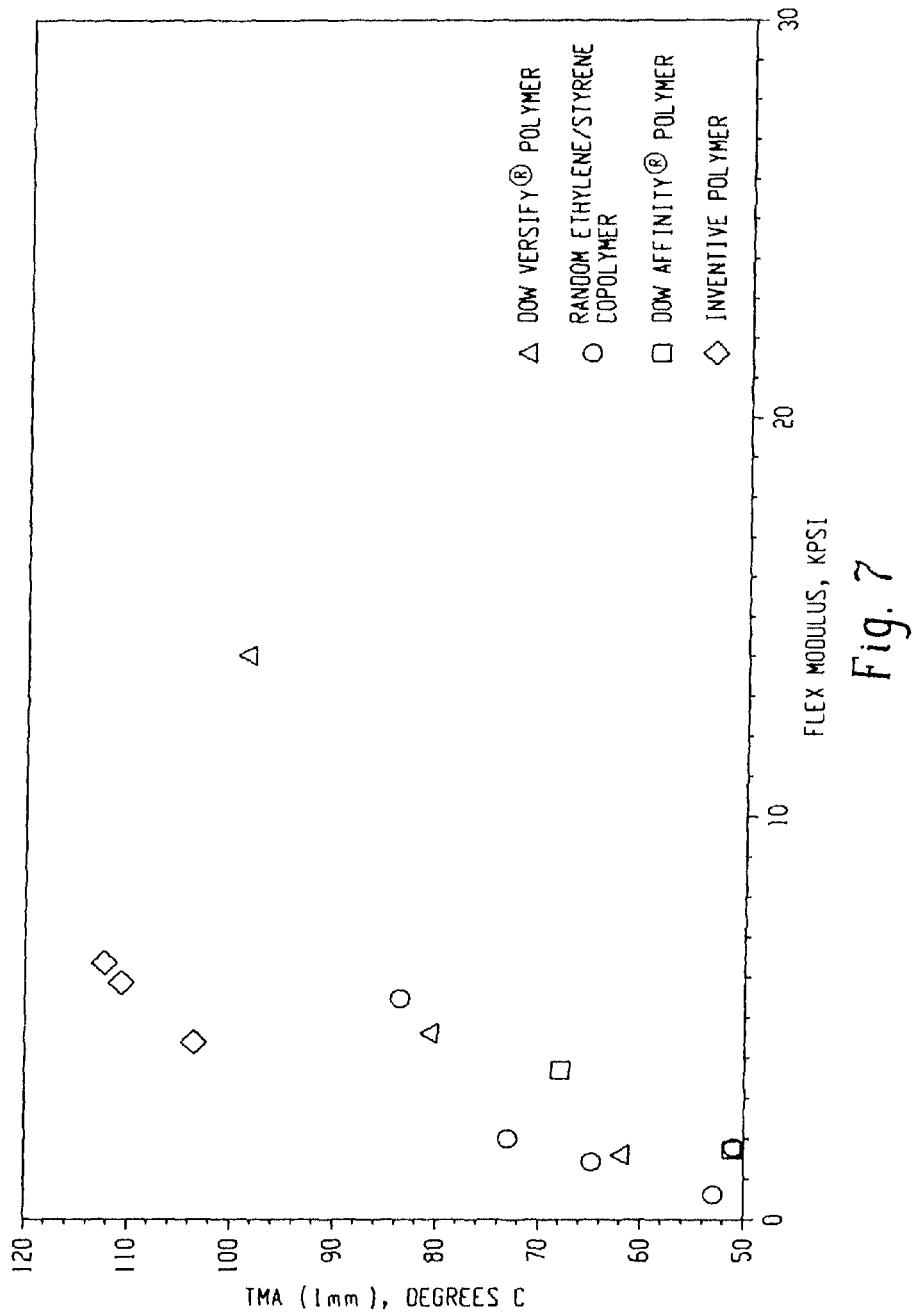
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:
(A) a first olefin polymerization catalyst having a high comonomer incorporation index,
(B) a second olefin polymerization catalyst having a comonomer incorporation index less than 90 percent, preferably less than 50 percent, most preferably less than 5 percent of the comonomer incorporation index of catalyst (A), and
(C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

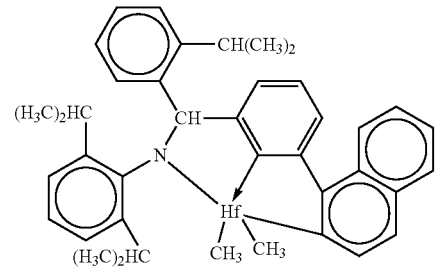

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

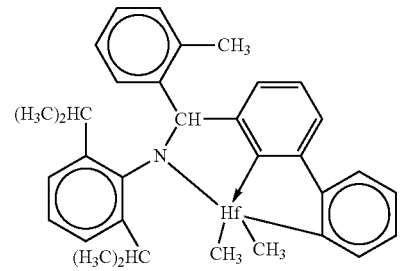

Catalyst (A3) is bis[N,N'''-(2,4,6-tri(methylphenyl)amido)ethylenediamine]hafnium dibenzyl.

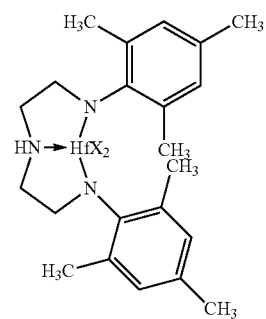

X = CH₂C₆H₅

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

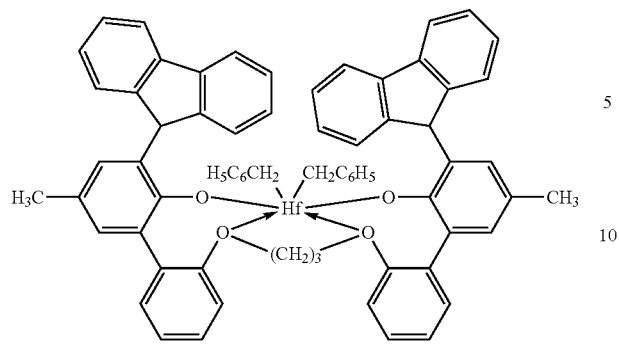

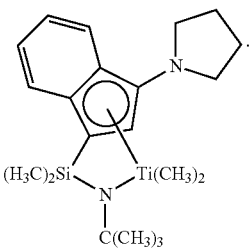

Catalyst (B1) is 1,2-bis-(3,5-di-t-butylphenylene)(1-(N-(1-methylethyl)immino)methyl)(2-oxoyl)zirconium dibenzyl Catalyst ($C_2$) is (t-butylamido)di(4-methylphenyl)(2-methyl-1,2,3,3a,7a-η-inden-1-yl)silanetitanium dimethyl prepared substantially according to the teachings of US-A-2003/004286:

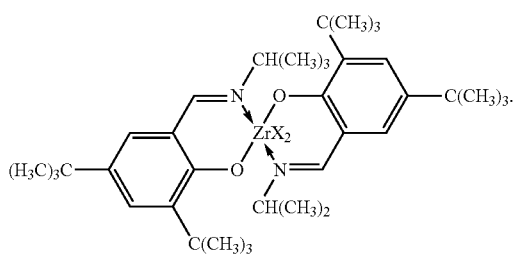

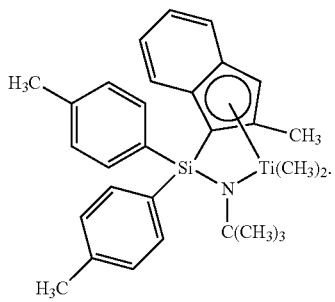

Catalyst (B2) is 1,2-bis-(3,5-di-t-butylphenylene)(1-(N-(2-methylcyclohexyl)-immino)methyl)(2-oxoyl) zirconium dibenzyl Catalyst ($C_3$) is (t-butylamido)di(4-methylphenyl)(2-methyl-1,2,3,3a,8a-η-s-indacen-1-yl)silanetitanium dimethyl prepared substantially according to the teachings of US-A-2003/004286:

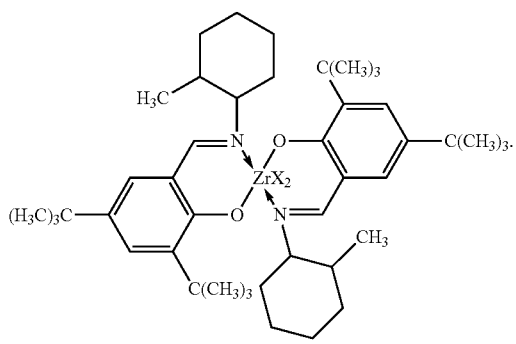

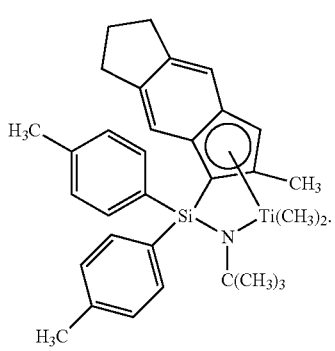

Catalyst ($C_1$) is (t-butylamido)dimethyl(3-N-pyrrolyl-1,2,3,3a,7a-ηinden-1-yl)silanetitanium dimethyl prepared substantially according to the techniques of U.S. Pat. No. 6,268,444:

Catalyst (D1) is bis(dimethyldisiloxane)(indene-1-yl)zirconium dichloride available from Sigma-Aldrich:

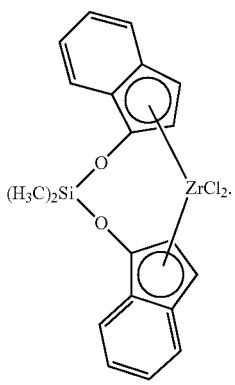

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxidel), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2=CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is maleic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Processes Involving a Post-Reactor Heat Exchanger

The inventive reaction processes may be effective in virtually any reaction which is capable of producing a metal alkyl compound, a metal oxide, or a mixture thereof and in which a post-reactor heat exchanger is employed. Such processes include solution processes for producing polymers like polyolefins. In one embodiment, the invention is useful for producing a composition comprising virtually any polyolefin which composition also comprises a metal alkyl compound, a metal oxide, or a mixture thereof and in which a post-reactor heat exchanger is employed. Typical such polyolefins include homopolymers, copolymers, terpolymers, etc. formed from monomers like ethylene, propylene, butylene, etc. The inventive processes may be useful in those reactions capable of producing propylene based plastomer or elastomer, preferably wherein the product comprises a propylene-ethylene interpolymer comprising at least about 80 mole percent propylene.

The processes have been found to be particularly effective in the production of the aforementioned inventive ethylene/α-olefin block interpolymers in which a chain shuttling agent such as diethyl zinc is employed in the process. Such ethylene/α-olefin block interpolymers may be characterized before any crosslinking by one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2; \text{ or}$$

(4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81$$

for ΔH greater than zero and up to 130 J/g, $$\Delta T \geq 48° \text{ C.}$$

for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1. The ethylene/α-olefin multiblock interpolymer preferably comprise at least 50 mole percent ethylene.

As stated above, the processes have been found to be particularly effective in the production of the aforementioned inventive ethylene/α-olefin block interpolymers using a metal catalyst and/or a chain shuttling agent. Suitable chain shuttling agents include diethylzinc, di(i-butyl) zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxidel), n-octylaluminum di(ethyl(1-naphthyl)amide), ethylaluminum bis(t-butyldimethylsiloxide), ethylaluminum di(bis(trimethyl silyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide). While not wishing to be bound to any particular theory it is believed that the processes are particularly effective in processes employing a chain shuttling agent because the formation of the foulant or discolorant is substantially reduced, hindered, or even eliminated.

While not wishing to bound to any particular theory it is believed that the foulants may be produced in the following manner when employing, for example, diethyl zinc. As the polymer leaves the reactor, much of the zinc is in the form of dipolymeryl zinc with two polymer chains per Zn molecule. The polymer may exit the reactor at a high temperature of about 140° C. or so and then become heated in, for example, a carbon-steel shell and tube post reactor heater (PRH) to from about 240 to about 250° C. prior to devolatilization. Often, before the polymer solution enters the post reactor heater a catalyst kill agent and/or water is added to deactivate any catalyst left in solution. The catalyst kill agent must also deactivate the dipolymeryl zinc to produce a more stable Zn species before it reaches the PRH temperatures. At temperatures above 140° C. dipolymeryl zinc, as with many metal alkyl compounds, is converted to a relatively insoluble zinc metal or zinc oxide compound which subsequently results in fouling and/or discolored polymer product. It is hypothesized that this decomposition may occur through a free radical mechanism. The instant inventors discovered that improvements can be achieved by employing one or more of the following four steps:

(1) reacting said metal alkyl compound with an acid to produce a soluble metal ester; or
(2) adding an ionic surfactant; or
(3) adding a mixture comprising an antioxidant to the product under conditions sufficient to avoid formation of significant amounts of insoluble metal or metal compounds derived from said metal alkyl compound; or
(4) purging said post-reactor heat exchanger with an inert gas under conditions to remove metal oxide from the post-reactor heat exchanger.

Reacting Metal Alkyl Compound(s) with Acid

It has been discovered that one way to substantially reduce, hinder, or even eliminate the majority of foulant of the PRH and/or discolorant from the product is by reacting any metal alkyl compound with a suitable acid to produce a soluble metal ester. The metal alkyl compounds may vary depending upon the reactants and, if present, any catalyst and/or chain shuttling agent, as well as, the reaction conditions. Typically, the metal of the metal alkyl compound is a transition metal or Group IIIA metal, or a combination thereof. Such metals often may include those selected from the group consisting of zinc, aluminum, and gallium. The alkyl group may be branched or unbranched. The alkyl group may be substituted or unsubstituted. Often, the alkyl group comprises a polymeric chain with a molecular weight of less than about 50,000 although some metal alkyl may not be reacted which means that the alkyl group may sometimes further comprise alkyl groups of about 2 carbons. Typically, the alkyl group comprises from about 2 to about 10,000 carbon atoms, preferably from about 1000 to about 5000 carbon atoms.

The acid is usually selected from those acids that are soluble in the reaction media employed. Suitable acids often include soluble carboxylic acids such as substituted or unsubstituted aliphatic metal ester. Suitable soluble carboxylic acids may comprise from about 6 to about 30 carbon atoms and preferably are saturated or unsaturated aliphatic carboxylic acids having from about 6 to about 20 carbon atoms such as stearic acid, octanoic acid, or a mixture thereof. Advantageously, the acid may be selected so that the soluble metal ester produced is such that it provides a desirable characteristic to the resulting product, i.e. one or more of the product properties are altered in a favorable way. That is one may employ a suitable acid such that the resulting soluble metal ester is selected from the group consisting of anti-slip agents, mold release agents, nucleating agents, lubricating agents, and anti-fungal agents. In this manner, a desired additive to the product may be produced in-situ. Desirable amounts of such agents would vary depending upon the application but would at least include an amount to perform the desired function, e.g., an anti-slipping effective amount, an anti-fungal effective amount, or a nucleating effective amount.

The reaction between metal alkyl compound with a suitable acid is conducted under suitable conditions to produce a soluble metal ester. These conditions may vary depending upon the specific metal alkyl compound, acid, and other compounds present. Advantageously, the conditions employed may simply be the conditions conventionally used to produce the desired polymer product. Thus, if the desired product is, for example, an ethylene/α-olefin block interpolymer the conditions normally employed to produce said interpolymer may be employed and the suitable acid may simply be added to the reactor after the polymerization process or, more preferably, the suitable acid is added to the reactor effluent as it leaves the reactor or shortly thereafter.

In any case it is often advantageous to add the acid, e.g., carboxylic acid, to the reaction prior to significant devolatization, e.g., prior to any significant post reactor heating, to more fully reduce, hinder, or even eliminate the majority of foulant of the PRH and/or discolorant from the interpolymer product. Also, it may be useful to mix the acid with a solvent such as an isoparaffinic solvent like ISOPAR E™ before reacting the acid with the heated metal alkyl compound. In this manner, the reaction to form a soluble metal ester is enhanced before said product comprising the interpolymer product and metal ester is passed to a post-reactor heat exchanger. Often, the interpolymer product is substantially free of metal oxide subsequent to the reaction of metal alkyl compound with an acid. This facilitates maintaining the heat exchange efficiency of the post reactor heat exchanger relatively constant over a longer time than if the acid had not been employed. That is, the efficiency drops less than about 2, preferably less than about 1, preferably less than about 0.5% per day.

The molar ratio of acid such as carboxylic acid to metal may be any convenient ratio so long as the desired amount of the desired ester is produced and/or the majority of foulant of the PRH and/or discolorant from the product is substantially reduced, hindered, or even eliminated. In many cases the desired ester and amount may be decided based upon how much one wishes to reduce or hinder the foulant of the PRH and/or discolorant from the product. That is, if one wishes to nearly eliminate (as opposed to just reduce) the foulant and/or discolorant, then one will likely attempt to completely react the metal. Typically, the molar ratio of acid to metal is from about 1:1 to about 10:1, preferably from about 1.25:1 to about 5:1, more preferably from about 1.5:1 to about 3:1. It may be desirable to mix the acid with water before reacting it with said metal alkyl compound if, for example, a soluble, complex metal ester is desired. Such complex metal esters, for example, include those having the formula $Zn_4O(C_nH_{2n+1}CO_2)_6$ wherein n is from about 5 to about 20. In the case of complex metal esters, the acid may be mixed with water in a molar ratio of acid to water of from about 10:1 to about 0.5:1, preferably from about 4:1 to about 7:1. Alternatively, the amount of water may be from about 20 to about 30 times the amount of metal on a molar basis and/or the amount of water is from about 16 to about 22 times the amount of acid on a molar basis. The useful specific metal:H2O:acid ratios vary depending on the ingredients and often upon the valency of the metal and ratio of metal to oxygen in the metal oxide. In the case of producing ethylene/α-olefin block interpolymers using a zinc shuttling agent such as diethyl zinc it has been found that a particularly useful zinc:$H_2O$:acid ratio is about 1-2:24-26:1.4-1.6.

Adding an Ionic Surfactant

It has been discovered that another way to substantially reduce, hinder, or even eliminate the majority of foulant of the PRH and/or discolorant from the product is by adding an ionic surfactant to the reactor after the polymerization process or, more preferably, the ionic surfactant is added to the reactor effluent as it leaves the reactor or shortly thereafter to form the desired product, e.g., ethylene/α-olefin block interpolymers. Advantageously, if the desired product is, for example, an ethylene/α-olefin block interpolymer, the conditions normally employed to produce said interpolymer may be employed and the suitable ionic surfactant may simply be added to the reactor effluent as it leaves the reactor.

The ionic surfactant may vary depending upon the reactants and, if present, any catalyst and/or chain shuttling agent, as well as, the reaction conditions. Typically, suitable ionic surfactants comprise a polar portion and a non-polar portion. Preferably, ionic surfactants comprise a fatty acid salt such as those selected from the group consisting of alkali metal fatty acid salts, alkaline earth metal fatty acid salts, and mixtures thereof. A particularly preferable ionic surfactant is a salt of stearic acid such as those selected from the group consisting of zinc stearate, calcium stearate, aluminum stearate, and mixtures thereof.

If desired, the ionic surfactant may be mixed with an effective amount of a suitable antistatic agent. Suitable antistatic agents and amounts vary widely depending upon the other ingredients. One suitable antistatic agent used when producing, for example, ethylene/α-olefin block interpolymers, is an alkoxylated alkylamine such as ethoxylated alkylamine. It has been found that a suitable amount of ethoxylated alkylamine mixed with a salt of stearic acid may be particularly effective in substantially reducing, hindering, or even eliminating the majority of foulant of the PRH and/or discolorant when producing an ethylene/α-olefin block interpolymer product.

The amount of ionic surfactant to be added varies depending upon the specific metal, other compounds, and reaction conditions. Typically, the molar ratio of ionic surfactant to metal is from about 1:3 to about 1:10, preferably from about 1:4 to about 1:6, more preferably about 1:5. On a mass basis the ratio of ionic surfactant to metal may be from about 0.5:1 to about 10:1, more preferably from about 1.5:1 to about 3:1, more preferably about 2:1. When ionic surfactant comprising a polar portion and a non-polar portion is added in these amounts, it has been found that the amount of deposits on the post reactor heat exchanger may be decreased by a factor of at least five as compared to when an ionic surfactant is not employed in the reaction process.

Adding a Mixture Comprising an Antioxidant

It has been discovered that another way to substantially reduce, hinder, or even eliminate the majority of foulant of the PRH and/or discolorant from the product is by adding a mixture comprising an antioxidant to the product under conditions sufficient to avoid formation of significant amounts, e.g., amounts that add visually observable color to the product, of insoluble metal or metal compounds derived from said metal alkyl compound.

Suitable antioxidants depend on the reactants and other products but for many polymer products such as ethylene/α-olefin block interpolymers suitable antioxidants may often be selected from the group consisting of sterically hindered phenols, sterically hindered phenyl phosphites, and mixtures thereof. Particularly preferable antioxidants are selected from the group consisting of di-octadecyl-3,5-di-tert-butyl-4-hydroxyhydrocinnamate (such as IRGANOX 1076), benzenepropanoic acid, 3,5-bis(1,1-dimethylethyl)-4-hydroxy-, 2,2-bis[[3-[3,5-bis(1,1-dimethylethyl)-4-hydroxyphenyl]-1-oxopropo (such as IRGANOX 1010), tertiary butyl phenyl phosphate (such as IRGAFOS 168), all of which are available from Ciba, and mixtures thereof.

The antioxidant may be mixed with other suitable compounds such as color stabilizers such as hindered amines like 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine (such as CHIMASSORB 2020), $N(C_{18}H_{37})_2OH$ (such as IRGASTAB FS 042), all of which are available from Ciba and mixtures thereof. Other compounds that may be useful in admixture or separate from the antioxidant include catalyst deactivators like deionized water, soluble protic quench agents, e.g., methanol, isopropanol, or a mixture, solvents such as isoparaffinic solvents comprising mixed alkanes like ISOPAR E, and mixtures thereof.

The mixture comprising antioxidant and, if desired, one or more color stabilizers, one or more catalyst deactivators, and/or one or more solvents is added to the desired product under conditions sufficient to avoid formation of significant amounts of insoluble metal or metal compounds derived from said metal alkyl compound. This may be accomplished in any convenient manner. Typically, said mixture is added to the product of said reaction process while passing said product to a post-reactor heat exchanger at an increased temperature. The increased temperature is usually below the vaporization temperature of the components and varies by the process. For ethylene/α-olefin block interpolymer product the antioxidant may be added at a temperature of from about 120° C. to about 200° C. In any event, the contacting may be accomplished by employing one or more streams of antioxidant, color stabilizer, catalyst deactivator, solvent, or any of the aforementioned separately or combined at any convenient temperature and pressure.

The relative amount of antioxidant and, if desired, one or more color stabilizers, one or more catalyst deactivators, and/or one or more solvents varies depending upon the process. In general, the amount of antioxidant, if any, varies depending upon the end use and requirements of the final product. Similarly, the amount and type of color stabilizer, if any, may vary depending upon the type of catalyst used. However, for ethylene/α-olefin block interpolymer product the antioxidant mixture typically comprises from about 0.2 to about 4.5, preferably from about 0.3 to about 3.5, weight percent antioxidant. When color stabilizer is employed the mixture typically comprises from about 0.2 to about 12, preferably from about 2 to about 11, weight percent color stabilizer.

Purging the Post-Reactor Heat Exchanger

Yet another way to substantially reduce, hinder, or even eliminate the majority of foulant in the PRH and/or discolorant from the product is by periodically purging the PRH. Such a purge may be accomplished in any manner but typically involves purging the post-reactor heat exchanger with a gas selected from nitrogen, ethylene, or air. Advantageously, this, like the other steps, may be done alone or in combination with the other three steps. It has been found that often the purge is most effective when purging the post-reactor heat exchanger with nitrogen first in one direction and then in the other. This can be done as often as necessary.

Percolation Cleaning of a Fouled Heat Exchanger

Yet another way to substantially reduce, hinder, or even eliminate the majority of foulant in the PRH and/or discolorant from the product is to periodically operate the heat exchanger at low pressure and/or high temperature conditions to induce flashing conditions (e.g. one or more solvents exceeds the boiling point). That is, boiling conditions are induced preferably in a flowing viscous solution. In this manner fouling materials such as scale, polymer residues, inorganic deposits, organic deposits, etc. may be reduced or removed from the surfaces of the heat exchanger (or any other pipe, valve, fitting, or vessel) via a vapor-liquid separation or "percolation" type effect. In one embodiment, little or no additional materials (e.g., abrasives, special solvents, or reactive chemicals) need to be added to the flowing viscous solution which often simply comprise one or more of the polymer product, solvent, and any byproducts which may or may not include the foulants. In another embodiment, the conditions employed include inducing boiling over 50%, preferably more than 95% of the surface area of the equipment, e.g, surface of heat exchanger which may be subject to fouling.

The temperature, pressures, and time employed may vary depending upon the specific product, equipment, and potential foulants. In some instances it may be advantageous to employ conditions such that the melting point, e.g., crystallization temperature, of the polymer to be produced is exceeded. Similarly, in some instances a rapid depressurization, a pulsing of pressure, or other non-steady state boiling conditions may facilitate the reduction or elimination of the one or more foulants.

Compositions of the Invention

Compositions of the present invention comprise an ethylene/α-olefin multiblock interpolymer and a metal ester. Typically, the ethylene/α-olefin multiblock interpolymer may be characterized before any crosslinking by one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2; \text{ or}$$

(4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81$$

for ΔH greater than zero and up to 130 J/g, $$\Delta T \geq 48° \text{ C.}$$

for ΔH greater than 130 J/g,
wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

The metal ester varies depending upon the desired characteristics of the composition but typically is a substituted or unsubstituted aliphatic metal ester. The metal ester preferably comprises from about 6 to about 30 carbon atoms. In one embodiment the substituted or unsubstituted aliphatic group is dependent upon the type of acid that may be employed as a catalyst deactivator. For example, if hexanoic acid is employed, then a C6 metal ester results while stearic acid may yield a C16 metal ester. The metal of the metal ester is a transition metal, Group IIA metal, Group IIIA metal, or a combination thereof. Preferably, the metal of the metal ester is selected from the group consisting of calcium, zinc, aluminum, and gallium. Particularly preferable metal esters include a metal stearate such as zinc stearate or calcium stearate, a metal octanoate such as zinc octanoate, or a mixture thereof.

The compositions may be made using the methods employed above wherein before, during, or subsequent to the production of the ethylene/α-olefin multiblock interpolymer, a metal alkyl compound is reacted with an acid to produce a soluble metal ester. Alternatively, the metal ester and ethylene/α-olefin multiblock interpolymer may be simply mixed in any convenient manner. Advantageously, when made by reacting the metal alkyl compound with an acid, the resulting compositions are often substantially free of metal oxides such as zinc oxides. This means that in many cases the compositions comprise less than about 100, preferably less than 50, more preferably less than 10 ppm of metal oxide based on the weight of the composition. A relatively low amount of metal oxide in the composition often reduces fouling of the PRH and may result in a whiter or less yellowed interpolymer product. Preferably, the resulting product in one embodiment has a whiteness index from above 50, preferably from about 50 to about 100, more preferably above about 70. In another embodiment, the resulting product has a yellowness index of from about 5 to about −30, preferably from about −1 to −15, more preferably less than about −2 according to ASTM D6290-05. In yet another embodiment, the resulting product has both a whiteness index and yellowness index within the aforementioned ranges.

The amount of a metal ester in the composition can vary depending upon the desired use of the composition and the desired role and type of the metal ester. That is, if the metal ester is employed as an anti-slip agent then it should be present in an anti-slipping effective amount. Similarly, if the metal ester is to be employed as an anti-fungal agent or nucleacting agent, then it should be present in an anti-fungal effective amount or nucleating effective amount, respectively. Typically, for most uses the metal ester need only be present in small amounts of less than about 3 weight percent. Preferably in most cases, the metal ester is present in an amount of from about 10 ppm to about 10,000 ppm, or from about 50 ppm to about 5,000 ppm, or from about 1000 ppm to about 2500 ppm, or from about 200 to about 1000ppm, based on the total weight of the composition.

The aforementioned compositions may be blended with one or more suitable additional polymers during the production of ethylene/α-olefin multiblock interpolymer or subsequently. Suitable polymers include, for example, a propylene based plastomer or elastomer, random ethylene copolymers such as AFFINITY® or ENGAGE®, traditional polyethylenes such as HDPE, LLDPE, ULDPE, LDPE and propylene-based polymers such as homopolymer PP, random copolymer PP or PP-based plastomers/elastomers or a combination thereof. The amount of such other polymers differs depending upon the desired properties and compatibility with the specific ethylene/α-olefin interpolymer and metal ester employed.

Useful propylene based plastomers or elastomers include polypropylenes formed by any means within the skill in the art. The propylene and optional comonomers, such as ethylene or alpha-olefin monomers are polymerized under conditions within the skill in the art, for instance, as disclosed by Galli, et al., Angew. Macromol. Chem., Vol. 120, 73 (1984), or by E. P. Moore, et al. in Polypropylene Handbook, Hanser Publishers, New York, 1996, particularly pages 11-98. Polypropylene polymers include Solvay's KS 4005 polypropylene copolymer; Solvay's KS 300 polypropylene terpolymer; and INSPIRE™ polymers and VERSIFY™ polymers, both available from The Dow Chemical Company.

Suitable branched propylene-based polymers for use in the present invention are commercially available, for instance from Montell North America, under the trade designations Profax PF-611 and PF-814. Alternatively, suitable branched or coupled propylene-based polymers can be prepared by means within the skill in the art, such as by peroxide or electron-beam treatment, for instance as disclosed by DeNicola et al., in U.S. Pat. No. 5,414,027 (the use of high energy (ionizing) radiation in a reduced oxygen atmosphere); EP 0 190 889 to Himont (electron beam irradiation of isotactic polypropylene at lower temperatures); U.S. Pat. No. 5,464,907 (Akzo Nobel NV); EP 0 754 711 Solvay (peroxide treatment); and U.S. patent application Ser. No. 09/133,576, filed Aug. 13, 1998 (azide coupling agents). Each of these patents/applications is incorporated herein by reference.

Other particularly suitable propylene-based polymers include VERSIFY™ polymers (The Dow Chemical Company) and VISTAMAXX™ polymers (ExxonMobil Chemical Co.), LICOCENE™ polymers (Clariant), EASTOFLEX™ polymers (Eastman Chemical Co.), REXTAC™ polymers (Hunstman), and VESTOPLAST™ polymers (Degussa). Other suitable polymers include propylene-α-olefins block copolymers and interpolymers, and other propylene based block copolymers and interpolymers known in the art.

Representative Embodiments of the Invention

The following embodiments are representative specific embodiments of the instant invention.

1. In a reaction process which comprises reacting a mixture via a reaction to form at least one product comprising a metal alkyl compound, a metal oxide, or a mixture thereof and then passing said product to at least one post-reactor heat exchanger, the improvement which comprises one or more of the following steps:

(1) reacting said metal alkyl compound with an acid to produce a soluble metal ester; or (2) adding an ionic surfactant after the reaction to form at least one product comprising a metal alkyl compound, a metal oxide, or a mixture thereof; or (3) adding a mixture comprising an antioxidant to the product under conditions sufficient to avoid formation of significant amounts of insoluble metal or metal compounds derived from said metal alkyl compound; or (4) purging said post-reactor heat exchanger with an inert gas under conditions to remove metal oxide from the post-reactor heat exchanger.

2. The reaction process of claim 1 wherein the product comprises a polymer.

3. The reaction process of one or more of the preceding claims wherein the product comprises a polyolefin.

4. The reaction process of one or more of the preceding claims wherein the product comprises a polyolefin selected from the group consisting of polyethylenes, polypropylenes, polybutylenes, and mixtures thereof.

5. The reaction process of one or more of the preceding claims wherein the product comprises an a propylene based plastomer or elastomer.

6. The reaction process of one or more of the preceding claims wherein the product comprises an a propylene-ethylene interpolymer comprising at least about 80 mole percent propylene.

7. The reaction process of one or more of the preceding claims wherein the product comprises an ethylene/α-olefin multiblock interpolymer.

8. The reaction process of one or more of the preceding claims wherein the product comprises an ethylene/α-olefin multiblock interpolymer which is characterized before any crosslinking by one or more of the following characteristics:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1; or (3) an Mw/Mn from about 1.7 to about 3.5, at least one melting point, Tm, in degrees Celsius, and a density, d, in grams/cubic centimeter, wherein the numerical values of Tm and d correspond to the relationship:

$$T_m > -6553.3 + 13735(d) - 7051.7(d)^2; \text{ or}$$

(4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81$$

for ΔH greater than zero and up to 130 J/g, $$\Delta T \geq 48° C.$$

for ΔH greater than 130 J/g,
wherein the CRYSTAF peak is determined using at least 5 percent of the cumulative polymer, and if less than 5 percent of the polymer has an identifiable CRYSTAF peak, then the CRYSTAF temperature is 30° C.; or (5) an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(6) a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (7) a storage modulus at 25° C., G'(25° C.), and a storage modulus at 100° C., G'(100° C.), wherein the ratio of G'(25° C.) to G'(100° C.) is in the range of about 1:1 to about 9:1.

9. The reaction process of one or more of the preceding claims wherein the product comprises an ethylene/α-olefin multiblock interpolymer comprising at least 50 mole percent ethylene.

10. The reaction process of one or more of the preceding claims wherein the process comprises employing a catalyst comprising a metal.

11. The reaction process of one or more of the preceding claims wherein the process comprises employing a shuttling agent.

12. The reaction process of one or more of the preceding claims wherein the process comprises employing a shuttling agent selected from the group consisting of diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

13. The reaction process of one or more of the preceding claims wherein the metal oxide is zinc oxide.

14. The reaction process of one or more of the preceding claims wherein the metal alkyl compound is reacted with an acid selected from the group consisting of soluble carboxylic acids under conditions sufficient to produce a soluble metal ester.

15. The reaction process of one or more of the preceding claims wherein the soluble carboxylic acid is a substituted or unsubstituted aliphatic metal ester.

16. The reaction process of one or more of the preceding claims wherein the soluble carboxylic acid comprises from about 6 to about 30 carbon atoms.

17. The reaction process of one or more of the preceding claims wherein the metal of the metal alkyl compound is a transition metal or Group IIIA metal, or a combination thereof.

18. The reaction process of one or more of the preceding claims wherein the metal of the metal alkyl compound is selected from the group consisting of zinc, aluminum, and gallium.

19. The reaction process of one or more of the preceding claims wherein the soluble carboxylic acid is a saturated or unsaturated aliphatic carboxylic acid having from about 6 to about 20 carbon atoms.

20. The reaction process of one or more of the preceding claims wherein the soluble carboxylic acid is stearic acid, octanoic acid, or a mixture thereof.

21. The reaction process of one or more of the preceding claims wherein subsequent to the reaction of metal alkyl compound with an acid the product is substantially free of metal oxide.

22. The reaction process of one or more of the preceding claims wherein the soluble metal ester produced is selected such that it provides a desirable characteristic to the resulting product.

23. The reaction process of one or more of the preceding claims wherein the soluble metal ester is selected from the group consisting of anti-slip agents, mold release agents, nucleating agents, lubricating agents, and anti-fungal agents.

24. The reaction process of one or more of the preceding claims wherein the carboxylic acid is added to the reaction prior to significant devolatization.

25. The reaction process of one or more of the preceding claims wherein the molar ratio of carboxylic acid to metal is from about 1:1 to about 10:1.

26. The reaction process of one or more of the preceding claims wherein the molar ratio of carboxylic acid to metal is from about 1.5:1 to about 3:1.

27. The reaction process of one or more of the preceding claims wherein the carboxylic acid is mixed with water before reacting it with said metal alkyl compound and wherein the resulting soluble metal ester is a complex metal ester.

28. The reaction process of one or more of the preceding claims wherein the carboxylic acid is mixed with water in a molar ratio of carboxylic acid to water of from about 10:1 to about 0.5:1.

29. The reaction process of one or more of the preceding claims wherein the amount of water is from about 20 to about 30 times the amount of metal on a molar basis and the amount of water is from about 16 to about 22 times the amount of carboxylic acid on a molar basis.

30. The reaction process of one or more of the preceding claims wherein the molar ratio of carboxylic acid is mixed with water in a molar ratio of carboxylic acid to water of from about 4:1 to about 7:1.

31. The reaction process of one or more of the preceding claims wherein the resulting soluble metal ester is a complex metal ester having the formula $Zn_4O(C_nH_{2n+1}CO_2)_6$ wherein n is from about 5 to about 20.

32. The reaction process of one or more of the preceding claims wherein the acid is mixed with an isoparaffinic solvent before reacting it with a heated metal alkyl compound to produce a soluble metal ester and then passing said product to a post-reactor heat exchanger.

33. The reaction process of one or more of the preceding claims wherein the heat exchange efficiency of the post reactor heat exchanger remains relatively constant over time.

34. The reaction process of one or more of the preceding claims wherein an ionic surfactant comprising a polar portion and a non-polar portion is added after the reaction.

35. The reaction process of one or more of the preceding claims wherein the ionic surfactant comprises a fatty acid salt.

36. The reaction process of one or more of the preceding claims wherein the ionic surfactant comprises a fatty acid salt selected from the group consisting of alkali metal fatty acid salts, alkaline earth metal fatty acid salts, and mixtures thereof.

37. The reaction process of one or more of the preceding claims wherein the ionic surfactant is a salt of stearic acid.

38. The reaction process of one or more of the preceding claims wherein the ionic surfactant is selected from the group consisting of zinc stearate, calcium stearate, aluminum stearate, and mixtures thereof.

39. The reaction process of one or more of the preceding claims wherein the ionic surfactant is mixed with an effective amount of antistatic agent.

40. The reaction process of one or more of the preceding claims wherein the antistatic agent is an alkoxylated alkylamine.

41. The reaction process of one or more of the preceding claims wherein the antistatic agent is an ethoxylated alkylamine.

42. The reaction process of one or more of the preceding claims wherein the molar ratio of ionic surfactant to metal is at least about 1:3.

43. The reaction process of one or more of the preceding claims wherein the molar ratio of ionic surfactant to metal is from about 1:3 to about 1:10.

44. The reaction process of one or more of the preceding claims wherein the ratio of ionic surfactant to metal is from about 0.5:1 to about 10:1 on a mass basis.

44. The reaction process of one or more of the preceding claims wherein the amount of deposits on the post reactor heat exchanger is decreased by a factor of at least five when an ionic surfactant comprising a polar portion and a non-polar portion is added as compared to when an ionic surfactant is not employed.

45. The reaction process of one or more of the preceding claims comprising adding a mixture comprising an antioxidant selected from the group consisting of sterically hindered phenols, sterically hindered phenyl phosphites, and mixtures thereof to the product under conditions sufficient to avoid formation of significant amounts of insoluble metal or metal compounds derived from said metal alkyl compound.

46. The reaction process of one or more of the preceding claims wherein the antioxidant is selected from the group consisting of di-octadecyl-3,5-di-tert-butyl-4-hydroxyhydrocinnamate, benzenepropanoic acid, 3,5-bis(1,1-dimethylethyl)-4-hydroxy-, 2,2-bis[[3-[3,5-bis(1,1-dimethylethyl)-4-hydroxyphenyl]-1-oxopropo, tertiary butyl phenyl phosphate, and mixtures thereof.

47. The reaction process of one or more of the preceding claims wherein the antioxidant is mixed with a color stabilizer, a catalyst deactivator, a solvent, or a mixture thereof.

48. The reaction process of one or more of the preceding claims wherein the color stabilizer is a hindered amine.

49. The reaction process of one or more of the preceding claims wherein the color stabilizer is 1,6-hexanediamine, N,N'-bis(2,2,6,6-tetramethyl-4-piperidinyl)-polymer with 2,4,6-trichloro-1,3,5-triazine, reaction products with N-butyl-1-butanamine and N-butyl-2,2,6,6-tetramethyl-4-piperidinamine, $N(C_{18}H_{37})_2OH$, and mixtures thereof.

50. The reaction process of one or more of the preceding claims wherein the solvent is an isoparaffinic solvent comprising mixed alkanes.

51. The reaction process of one or more of the preceding claims wherein the catalyst deactivator is selected from the group consisting of deionized water, soluble protic quench agents, and mixtures thereof.

52. The reaction process of one or more of the preceding claims wherein the soluble protic quench agent is selected from the group consisting of methanol, isopropanol, and mixtures thereof.

53. The reaction process of one or more of the preceding claims wherein a mixture comprising antioxidant, color stabilizer, and solvent is contacted with a product of said reaction process while passing said product to a post-reactor heat exchanger.

54. The reaction process of one or more of the preceding claims wherein a mixture comprising antioxidant, color stabilizer, catalyst deactivator, and solvent is contacted with a product of said reaction process while passing said product to a post-reactor heat exchanger.

55. The reaction process of one or more of the preceding claims wherein an antioxidant, color stabilizer, catalyst deactivator, and solvent are contacted with a product of said reaction process while passing said product to a post-reactor heat exchanger.

56. The reaction process of one or more of the preceding claims wherein an antioxidant, color stabilizer, catalyst deactivator, and solvent are contacted with a product of said reaction process while passing said product to a post-reactor heat exchanger and said contacting is accomplished by one or more streams of antioxidant, color stabilizer, catalyst deactivator, solvent, or mixtures thereof.

57. The reaction process of one or more of the preceding claims wherein a mixture comprising antioxidant, color stabilizer, and solvent is contacted with a product of said reaction process while passing said product to a post-reactor heat exchanger wherein said mixture comprises from about 0.2 to about 4.5 weight percent antioxidant.

58. The reaction process of one or more of the preceding claims wherein a mixture comprising antioxidant, color stabilizer, and solvent is contacted with a product of said reaction process while passing said product to a post-reactor heat exchanger wherein said mixture comprises from about 0.3 to about 3.5 weight percent antioxidant.

59. The reaction process of one or more of the preceding claims wherein a mixture comprising antioxidant, color stabilizer, and solvent is contacted with a product of said reaction process while passing said product to a post-reactor heat exchanger wherein said mixture comprises from about 0.2 to about 12 weight percent color stabilizer.

60. The reaction process of one or more of the preceding claims wherein a mixture comprising antioxidant, color stabilizer, and solvent is contacted with a product of said reaction process while passing said product to a post-reactor heat exchanger wherein said mixture comprises from about 2 to about 11 weight percent color stabilizer.

61. The reaction process of one or more of the preceding claims wherein the mixture comprising antioxidant is added at a temperature of from about 120° C. to about 200° C.
62. The reaction process of one or more of the preceding claims which comprises purging the post-reactor heat exchanger with a gas selected from nitrogen, ethylene, or air.
63. The reaction process of one or more of the preceding claims which comprises purging the post-reactor heat exchanger with nitrogen first in one direction and then in the other.
64. A composition comprising an ethylene/α-olefin multi-block interpolymer and a metal ester.
65. The composition of one or more of the preceding claims wherein the metal ester is a substituted or unsubstituted aliphatic metal ester.
66. The composition of one or more of the preceding claims wherein the metal ester comprises from about 6 to about 30 carbon atoms.
67. The composition of one or more of the preceding claims wherein the metal of the metal ester is a transition metal or Group IIIA metal, or a combination thereof.
68. The composition of one or more of the preceding claims wherein the metal of the metal ester is selected from the group consisting of zinc, aluminum, and gallium.
69. The composition of one or more of the preceding claims wherein the metal ester is a metal stearate, a metal octanoate, or a mixture thereof.
70. The composition of one or more of the preceding claims wherein the metal ester is zinc stearate, zinc octanoate, or a mixture thereof.
71. The composition of one or more of the preceding claims wherein the composition is substantially free of metal oxide.
72. The composition of one or more of the preceding claims wherein the composition is substantially free of zinc oxide.
73. The composition of one or more of the preceding claims wherein the composition comprises less than about 100 ppm of metal oxide based on the weight of the composition.
74. The composition of one or more of the preceding claims wherein the composition comprises less than about 50 ppm of metal oxide based on the weight of the composition.
75. The composition of one or more of the preceding claims wherein the composition comprises less than about 10 ppm of metal oxide based on the weight of the composition.
76. The composition of one or more of the preceding claims wherein the metal ester is present in an anti-slipping effective amount.
77. The composition of one or more of the preceding claims wherein the metal ester is present in an anti-fungal effective amount.
78. The composition of one or more of the preceding claims wherein the metal ester is present in a nucleating effective amount.
79. The composition of one or more of the preceding claims wherein the metal ester is present in an amount of from about 10 ppm to about 10,000 ppm based on the total weight of the composition.
80. The composition of one or more of the preceding claims wherein the metal ester is present in an amount of from about 50 to about 5,000 ppm based on the total weight of the composition.
81. The composition of one or more of the preceding claims wherein the metal ester is present in an amount of from about 1000 to about 2500 ppm based on the total weight of the composition.
82. The composition of one or more of the preceding claims wherein the resulting product has a whiteness index above 50.
83. The composition of one or more of the preceding claims wherein the resulting product has a yellowness index less than −2.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epochim software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.,* 6, 621 (1968)): $M_{polyethylene}=0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min$^{-1}$ at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entireties. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400MHz spectrometer or a Varian Unity Plus™ 400MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat #Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.

a) Preparation of (1-methylethyl)(2-hydroxy-3,5-di (t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene) (1-(N-(1-methylethyl)immino)methyl)(2-oxoyl)zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and $Li[B(C_6F_5)_4]$, substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl(t-butyl)siloxane) (SA7), i-butylaluminum bis(di (trimethylsilyl)amide) (SA8), n-octylaluminum di(pyridine-2-methoxide) (SA9), bis(n-octadecyl)i-butylaluminum (SA10), 1-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis(trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) G(SA19), and ethylzinc (t-butoxide) (SA20).

EXAMPLES 1-4, COMPARATIVE A-C

General High Throughput Parallel Polymerization Conditions

Polymerizations are conducted using a high throughput, parallel polymerization reactor (PPR) available from Symyx Technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1 /MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B 1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

EXAMPLES 5-19, COMPARATIVES D-F

Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | C$_8$H$_{16}$ kg/hr | Solv. kg/hr | H$_2$ sccm[1] | T °C. | Cat A1[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | [C$_2$H$_4$]/[DEZ][4] | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | " | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1]standard cm$^3$/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]molar ratio in reactor
[5]polymer production rate
[6]percent ethylene conversion in reactor
[7]efficiency, kg polymer/g M where g M = g Hf + g Zr

TABLE 3

Properties of exemplary polymers

| Ex. | Density (g/cm$^3$) | I$_2$ | I$_{10}$ | I$_{10}$/I$_2$ | Mw (g/mol) | Mn (g/mol) | Mw/Mn | Heat of Fusion (J/g) | T$_m$ (° C.) | T$_c$ (° C.) | T$_{CRYSTAF}$ (° C.) | Tm − T$_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®, available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from. The Dow Chemical Company), Comparative J is a hydrogenated styrene/butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft$^2$ (kPa) | G'(25° C.)/ G'(100° C.) | 300 % Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |

TABLE 4-continued

High Temperature Mechanical Properties

| Ex. | TMA-1 mm penetration (° C.) | Pellet Blocking Strength lb/ft² (kPa) | G'(25° C.)/ G'(100° C.) | 300 % Strain Recovery (80° C.) (percent) | Compression Set (70° C.) (percent) |
|---|---|---|---|---|---|
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)¹ | Elongation at Break¹ (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain² |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

¹Tested at 51 cm/minute
²measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm$^3$, preferably less than about 80 mm$^3$, and especially less than about 50 mm$^3$. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Optical Properties

| Ex. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |

TABLE 7-continued

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}C$ NMR

ADDITIONAL POLYMER EXAMPLES 19 A-J

Continuous Solution Polymerization, Catalyst A1/B2+DEZ

For Examples 19A-I

Continuous solution polymerizations are carried out in a computer controlled well-mixed reactor. Purified mixed alkanes solvent (Isopar™ E available from Exxon Mobil, Inc.), ethylene, 1-octene, and hydrogen (where used) are combined and fed to a 27 gallon reactor. The feeds to the reactor are measured by mass-flow controllers. The temperature of the feed stream is controlled by use of a glycol cooled heat exchanger before entering the reactor. The catalyst component solutions are metered using pumps and mass flow meters. The reactor is run liquid-full at approximately 550 psig pressure. Upon exiting the reactor, water and additive are injected in the polymer solution. The water hydrolyzes the catalysts, and terminates the polymerization reactions. The post reactor solution is then heated in preparation for a two-stage devolatization. The solvent and unreacted monomers are removed during the devolatization process. The polymer melt is pumped to a die for underwater pellet cutting.

For Example 19J

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer.

Process details and results are contained in Table 8. Selected polymer properties are provided in Tables 9A-C.

In Table 9B, inventive examples 19F and 19G show low immediate set of around 65-70% strain after 500% elongation.

TABLE 8

Polymerization Conditions

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % | DEZ Flow lb/hr |
|---|---|---|---|---|---|---|---|---|---|---|---|
| 19A | 55.29 | 32.03 | 323.03 | 101 | 120 | 600 | 0.25 | 200 | 0.42 | 3.0 | 0.70 |
| 19B | 53.95 | 28.96 | 325.3 | 577 | 120 | 600 | 0.25 | 200 | 0.55 | 3.0 | 0.24 |
| 19C | 55.53 | 30.97 | 324.37 | 550 | 120 | 600 | 0.216 | 200 | 0.609 | 3.0 | 0.69 |
| 19D | 54.83 | 30.58 | 326.33 | 60 | 120 | 600 | 0.22 | 200 | 0.63 | 3.0 | 1.39 |
| 19E | 54.95 | 31.73 | 326.75 | 251 | 120 | 600 | 0.21 | 200 | 0.61 | 3.0 | 1.04 |
| 19F | 50.43 | 34.80 | 330.33 | 124 | 120 | 600 | 0.20 | 200 | 0.60 | 3.0 | 0.74 |
| 19G | 50.25 | 33.08 | 325.61 | 188 | 120 | 600 | 0.19 | 200 | 0.59 | 3.0 | 0.54 |
| 19H | 50.15 | 34.87 | 318.17 | 58 | 120 | 600 | 0.21 | 200 | 0.66 | 3.0 | 0.70 |
| 19I | 55.02 | 34.02 | 323.59 | 53 | 120 | 600 | 0.44 | 200 | 0.74 | 3.0 | 1.72 |
| 19J | 7.46 | 9.04 | 50.6 | 47 | 120 | 150 | 0.22 | 76.7 | 0.36 | 0.5 | 0.19 |

| Ex. | Cocat 1 Conc. ppm | Cocat 1 Flow lb/hr | Cocat 2 Conc. ppm | Cocat 2 Flow lb/hr | $Zn^{4}$ in polymer ppm | Poly Rate[5] lb/hr | Conv[6] wt % | Polymer wt % | Eff.[7] |
|---|---|---|---|---|---|---|---|---|---|
| 19A | 4500 | 0.65 | 525 | 0.33 | 248 | 83.94 | 88.0 | 17.28 | 297 |
| 19B | 4500 | 0.63 | 525 | 0.11 | 90 | 80.72 | 88.1 | 17.2 | 295 |
| 19C | 4500 | 0.61 | 525 | 0.33 | 246 | 84.13 | 88.9 | 17.16 | 293 |

TABLE 8-continued

| | | | | | Polymerization Conditions | | | | | |
|---|---|---|---|---|---|---|---|---|---|---|
| 19D | 4500 | 0.66 | 525 | 0.66 | 491 | 82.56 | 88.1 | 17.07 | 280 | |
| 19E | 4500 | 0.64 | 525 | 0.49 | 368 | 84.11 | 88.4 | 17.43 | 288 | |
| 19F | 4500 | 0.52 | 525 | 0.35 | 257 | 85.31 | 87.5 | 17.09 | 319 | |
| 19G | 4500 | 0.51 | 525 | 0.16 | 194 | 83.72 | 87.5 | 17.34 | 333 | |
| 19H | 4500 | 0.52 | 525 | 0.70 | 259 | 83.21 | 88.0 | 17.46 | 312 | |
| 19I | 4500 | 0.70 | 525 | 1.65 | 600 | 86.63 | 88.0 | 17.6 | 275 | |
| 19J | — | — | — | — | — | — | — | — | — | |

[1] standard $cm^3$/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dimethyl
[4] ppm in final product calculated by mass balance
[5] polymer production rate
[6] weight percent ethylene conversion in reactor
[7] efficiency, kg polymer/g M where g M = g Hf + g Z

TABLE 9A

Polymer Physical Properties

| Ex. | Density (g/cc) | I2 | I10 | I10/I2 | Mw (g/mol) | Mn (g/mol) | Mw/Mn | Heat of Fusion (J/g) | Tm (° C.) | Tc (° C.) | TCRYSTAF (° C.) | Tm − TCRYSTAF (° C.) | CRYSTAF Peak Area (wt %) |
|---|---|---|---|---|---|---|---|---|---|---|---|---|---|
| 19A | 0.8781 | 0.9 | 6.4 | 6.9 | 123700 | 61000 | 2.0 | 56 | 119 | 97 | 46 | 73 | 40 |
| 19B | 0.8749 | 0.9 | 7.3 | 7.8 | 133000 | 44300 | 3.0 | 52 | 122 | 100 | 30 | 92 | 76 |
| 19C | 0.8753 | 5.6 | 38.5 | 6.9 | 81700 | 37300 | 2.2 | 46 | 122 | 100 | 30 | 92 | 8 |
| 19D | 0.8770 | 4.7 | 31.5 | 6.7 | 80700 | 39700 | 2.0 | 52 | 119 | 97 | 48 | 72 | 5 |
| 19E | 0.8750 | 4.9 | 33.5 | 6.8 | 81800 | 41700 | 2.0 | 49 | 121 | 97 | 36 | 84 | 12 |
| 19F | 0.8652 | 1.1 | 7.5 | 6.8 | 124900 | 60700 | 2.1 | 27 | 119 | 88 | 30 | 89 | 89 |
| 19G | 0.8649 | 0.9 | 6.4 | 7.1 | 135000 | 64800 | 2.1 | 26 | 120 | 92 | 30 | 90 | 90 |
| 19H | 0.8654 | 1.0 | 7.0 | 7.1 | 131600 | 66900 | 2.0 | 26 | 118 | 88 | — | — | — |
| 19I | 0.8774 | 11.2 | 75.2 | 6.7 | 66400 | 33700 | 2.0 | 49 | 119 | 99 | 40 | 79 | 13 |
| 19J | 0.8995 | 5.6 | 39.4 | 7.0 | 75500 | 29900 | 2.5 | 101 | 122 | 106 | — | — | — |

TABLE 9B

Polymer Physical Properties of Compression Molded Film

| Example | Density (g/cm³) | Melt Index (g/10 min) | Immediate Set after 100% Strain (%) | Immediate Set after 300% Strain (%) | Immediate Set after 500% Strain (%) | Recovery after 100% (%) | Recovery after 300% (%) | Recovery after 500% (%) |
|---|---|---|---|---|---|---|---|---|
| 19A | 0.878 | 0.9 | 15 | 63 | 131 | 85 | 79 | 74 |
| 19B | 0.877 | 0.88 | 14 | 49 | 97 | 86 | 84 | 81 |
| 19F | 0.865 | 1 | — | — | 70 | — | 87 | 86 |
| 19G | 0.865 | 0.9 | — | — | 66 | — | — | 87 |
| 19H | 0.865 | 0.92 | — | 39 | — | — | 87 | — |

TABLE 9C

Average Block Index For exemplary polymers[1]

| Example | Zn/$C_2$[2] | Average BI |
|---|---|---|
| Polymer F | 0 | 0 |
| Polymer 8 | 0.56 | 0.59 |
| Polymer 19a | 1.3 | 0.62 |
| Polymer 5 | 2.4 | 0.52 |
| Polymer 19b | 0.56 | 0.54 |
| Polymer 19h | 3.15 | 0.59 |

[1] Additional information regarding the calculation of the block indices for various polymers is disclosed in U.S. pat. application Ser. No. 11/376,835, entitled "Ethylene/α-Olefin Block Interpolymers", filed on Mar. 15, 2006, in the name of Colin L. P. Shan. Lonnie Hazlitt, et. al. and assigned to Dow Global Technologies Inc., the disclose of which is incorporated by reference herein in its entirety.
[2] Zn/$C_2$ *1000 = (Zn feed flow*Zn concentration/1000000/Mw of Zn)/(Total Ethylene feed flow*(1-fractional ethylene conversion rate)/Mw of Ethylene)*1000. Please note that "Zn" in "Zn/$C_2$*1000" refers to the amount of zinc in diethyl zinc ("DEZ") used in the polymerization process, and "C2" refers to the amount of ethylene used in the polymerization process.

EXAMPLES 20 AND 21

The ethylene/α-olefin interpolymer of Examples 20 and 21 were made in a substantially similar manner as Examples 19A-I above with the polymerization conditions shown in Table 11 below. The polymers exhibited the properties shown in Table 10. Table 10 also shows any additives to the polymer.

TABLE 10

Properties and Additives of Examples 20-21

|  | Example 20 |  | Example 21 |  |
|---|---|---|---|---|
| Density (g/cc) | 0.8800 |  | 0.8800 |  |
| MI | 1.3 |  | 1.3 |  |
| Additives | DI Water | 100 | DI Water | 75 |
|  | Irgafos 168 | 1000 | Irgafos 168 | 1000 |
|  | Irganox 1076 | 250 | Irganox 1076 | 250 |
|  | Irganox 1010 | 200 | Irganox 1010 | 200 |
|  | Chimmasorb 2020 | 100 | Chimmasorb 2020 | 80 |

Irganox 1010 is Tetrakismethylene(3,5-di-t-butyl-4-hydroxyhydrocinnamate)methane. Irganox 1076 is Octadecyl-3-(3',5'-di-t-butyl-4'-hydroxyphenyl)propionate. Irgafos 168 is Tris(2,4-di-t-butylphenyl)phosphite. Chimasorb 2020 is 1,6-Hexanediamine, N,N'-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidinamine.

TABLE 11

Polymerization Conditions for Examples 20-21

| Ex. | $C_2H_4$ lb/hr | $C_8H_{16}$ lb/hr | Solv. lb/hr | $H_2$ sccm[1] | T °C. | Cat A1[2] Conc. ppm | Cat A1 Flow lb/hr | Cat B2[3] Conc. ppm | Cat B2 Flow lb/hr | DEZ Conc wt % |
|---|---|---|---|---|---|---|---|---|---|---|
| 20 | 130.7 | 196.17 | 712.68 | 1767 | 120 | 499.98 | 1.06 | 298.89 | 0.57 | 4.809423 |
| 21 | 132.13 | 199.22 | 708.23 | 1572 | 120 | 462.4 | 1.71 | 298.89 | 0.6 | 4.999847 |

| Ex. | DEZ Flow lb/hr | Cocat 1 Conc. ppm | Cocat 1 Flow lb/hr | Cocat 2 Conc. ppm | Cocat 2 Flow lb/hr | $Zn^4$ in polymer ppm | Poly Rate[5] lb/hr | Conv[6] wt % | Polymer wt % | Eff.[7] |
|---|---|---|---|---|---|---|---|---|---|---|
| 20 | 0.48 | 5634.36 | 1.24 | 402.45 | 0.478 | 131 | 177 | 89.25 | 16.94 | 252.04 |
| 21 | 0.47 | 5706.4 | 1.61 | 289.14 | 1.36 | 129 | 183 | 89.23 | 17.52 | 188.11 |

*Comparative, not an example of the invention
[1]standard cm³/min
[2][N-(2,6-di(1-methylethyl)phenyl)amido)(2-isopropylphenyl)(α-naphthalen-2-diyl(6-pyridin-2-diyl)methane)]hafnium dimethyl
[3]bis-(1-(2-methylcyclohexyl)ethyl)(2-oxoyl-3,5-di(t-butyl)phenyl)immino) zirconium dibenzyl
[4]ppm Zinc in final product calculated by mass balance
[5]polymer production rate
[6]weight percent ethylene conversion in reactor
[7]efficiency, kg polymer/g M where g M = g Hf + g Z

EXAMPLE 22

Improving the Ethylene/α-Olefin Multiblock Interpolymer Process of Examples 1-21

Each of the above Examples 1-21 to produce ethylene/α-olefin multiblock interpolymer may be repeated and a metal alkyl compound may be reacted with an acid to produce a soluble metal ester; or an ionic surfactant may be added to the reactor or reactor effluent after the reaction; or a mixture comprising an antioxidant may be added to the product under conditions sufficient to avoid formation of significant amounts of insoluble metal or metal compounds derived from said metal alkyl compound; or the post-reactor heat exchanger may be purged with an inert gas under conditions to remove metal oxide from the post-reactor heat exchanger.

It is expected that the result will be a substantial reduction, hinderance, or even eliminatation of the majority of foulant of the heat exchanger. Also, it is expected that the resulting ethylene/α-olefin multiblock interpolymer product will have an equal or improved color as compared to the product of Examples 1-21.

EXAMPLE 23

Adding Calcium Stearate

Ethylene/α-olefin multiblock interpolymer having a melt index of 15 and a density of 0.877 g/cc is produced in a similar manner to that Example 19. Water is employed as a catalyst deactivator at a 1.5:1 molar ratio with respect to the diethyl zinc chain shuttling agent. 500 ppm of calcium stearate (on a polymer basis) is added to the polymer stream just prior to the post-reactor heat exchanger (PRH). The heat transfer efficiency is measured by calculating a dimensionless U value based on the flows and temperatures of the polymer stream and the heat transfer fluid. On a continuous basis over a five day period the heat transfer efficiency drop is less than about 1% per day whereas continuously producing the same product in the absence of calcium stearate addition causes the heat transfer efficiency to drop approximately 5% per day. The amount of fouling is dependent upon the amount of calcium stearate employed as shown in the table below. The addition of calcium stearate at levels of approximately from about 2 to about 3 times as high as the amount of Zn in the polymer (on a mass basis) leads to post reactor heater fouling at a rate approximately ¹/₁₀th that of identical runs performed without the addition of calcium stearate.

Effect of calcium stearate and zinc on post reactor heater fouling

| Zn in polymer (ppm) | Calcium stearate in polymer (ppm) | Calcium stearate/Zn ratio | Fouling (% per day) |
|---|---|---|---|
| 240 | 0 | 0 | 5.2 |
| 240 | 200 | 0.83 | 2.6 |
| 240 | 300 | 1.25 | 1 |
| 240 | 500 | 2.1 | 0.4 |
| 180 | 500 | 2.8 | 0.5 |
| 240 | 750 | 3.1 | 0.25 |
| 130 | 500 | 3.9 | 0.25 |
| 240 | 1250 | 5.2 | 0.5 |

EXAMPLE 24

Reacting Octanoic Acid

Ethylene/α-olefin multiblock interpolymer is produced in a similar manner as in Example 23 except that water was not employed as the catalyst deactivator and calcium stearate is not added. Instead, octanoic acid is mixed with Isopar E at room temperature and then pumped into the approximately 17% polymer stream which is at approximately 140° C. and located prior to the PRH. The amount of octanoic acid employed is 2 moles of acid for every mole of zinc in the process stream. The efficiency of the PRH drops less than 0.1% per day over a six day period as compared to an approximately 5% drop per day without the use of octanoic acid.

EXAMPLE 25

Reacting Stearic Acid

Ethylene/α-olefin multiblock interpolymer is produced in a similar manner as in Example 24 except that stearic acid is employed instead of octanoic acid. The efficiency of the PRH drops less than 0.1% per day over a four day period as compared to an approximately 5% drop per day without the use of stearic acid.

EXAMPLE 26

Adding a Mixture Comprising an Antioxidant

Ethylene/α-olefin multiblock interpolymer is produced in a similar manner to that in examples 1-21 except that various additives are added and the amount and temperature of water is varied during the catalyst neutralization step as shown in the table below.

| Irganox 1076 ™ (ppm) | Irganox 1010 ™ (ppm) | Irgastab FS 042 ™ (ppm) | Whiteness index | comments |
|---|---|---|---|---|
| 250 | 200 | 0 | 46 | antioxidant added before PRH |
| 500 | 400 | 0 | 60 | Double antioxidant added before PRH |
| 0 | 0 | 0 | 33 | 1.5 eq water |
| 0 | 0 | 0 | 27 | 0.5 eq waater |
| 0 | 0 | 0 | 71 | 1.5 eq water at 75 C. |
| 0 | 0 | 0 | 56 | 1.5 eq water with 5% isopropyl alcohol |
| 50 | 0 | 0 | 62 | 1.5 eq water |
| 100 | 0 | 0 | 63 | 1.5 eq water |
| 0 | 0 | 100 | 66 | 1.5 eq water |
| 0 | 0 | 200 | 59 | 1.5 eq water |

The amount of zinc in each final product is approximately 240 ppm as calculated by mass balance. It is determined that when necessary to increase the water solubility, a small amount of an alcohol is useful to break surface tension. Similarly, increasing the water temperature yields an increase in solubility. As the table above shows whiteness index increases (gray color formation is mitigated) by adding antioxidants during the catalyst neutralization step, adding hot (>50C) water temperature during the catalyst neutralization step, and/or adding an alcohol (e.g. isopropanol) during the catalyst neutralization step. That is if one consider the third row as the control a whiteness index of 33 is obtained. When an antioxidant is added before the PRH as in rows 1, 2, 7 and 8 the whiteness index increases. When hot water is added as in row 5 the whiteness index increases. Similarly, when one adds alcohol with the water as in row 6 the whiteness index gets higher. Also if Irgastab FS 042™ stabilizer is added before the PRH, then the whiteness index increases.

EXAMPLE 27

Adding a Mixture Comprising Water and Stearic Acid

Ethylene/α-olefin multiblock interpolymer is produced in a similar manner as in Example 23 except that a mixture of water and stearic acid are employed as the catalyst deactivator and calcium stearate is not added. Instead, stearic acid is mixed with Isopar E at room temperature and then pumped into the approximately 17% polymer stream which is at approximately 140° C. along with the water and located prior to the PRH. The amount of octanoic acid employed is 1 mole of acid for every mole of zinc in the process stream and the amount of water employed is 0.75 moles of water for every mol of Zinc in the process stream. The efficiency of the PRH can be expected to drop less than 0.1% per day over a three day period as compared to an approximately 5% drop per day without the use of water and stearic acid.

EXAMPLE 28

Adding a Mixture Comprising Water and Octanoic Acid

Ethylene/α-olefin multiblock interpolymer is produced in a similar manner as in Example 23 except that a mixture of water and octanoic acid are employed as the catalyst deactivator and calcium stearate is not added. Instead, octanoic acid is mixed with Isopar E at room temperature and then pumped into the approximately 17% polymer stream which is at approximately 140° C. along with the water and located prior to the PRH. The amount of octanoic acid employed is 1 mole of acid for every mole of zinc in the process stream and the amount of water employed is 0.75 moles of water for every mol of Zinc in the process stream. The efficiency of the PRH can be expected to drop less than 0.1% per day over a three day period as compared to an approximately 5% drop per day without the use of water and octanoic acid.

EXAMPLE 29

Nitrogen Purge

Ethylene/α-olefin multiblock interpolymer is produced in a similar manner to that in Examples 1-21. When polymer production is halted, a solvent is flowed through the post-reactor heat exchanger at approximately 185 C to dissolve any remaining polymer. Nitrogen is used to pad all solvent out of the PRH. A filter bag is placed over one outlet of the PRH. Nitrogen is blown through the exchanger in a first direction toward the outlet. The filter bag is removed and a new one installed at the opposite end of the PRH. Nitrogen is blown through the exchanger in the opposite direction. Prior to the nitrogen purge the heat transfer efficiency of the PRH is less than 65% of the value for a completely clean exchanger while after the nitrogen purge the heat transfer efficiency of the PRH is greater than 90% of the value for a clean exchanger.

EXAMPLE 30

Percolation Cleaning

A post reactor shell and tube heat exchanger heat exchanger comprising 19 tubes is employed to produce a LLDPE (1 MI, 0.920 g/cc) in Isopar E at 23% polymer concentration. The pressure is reduced at the inlet pressure such that the ΔP (psi) (inlet pressure-outlet pressure) varies as shown below.

| Run | ΔP (psi) |
|-----|----------|
| Run 1-A | 39 |
| Run 1-B | 38 |
| Run 2 | 48 |
| Run 3 | 111 |
| Run 4 | 188 |
| Run 5 | 197 |
| Run 6 | 187 |
| Run 7 | 210 |

Extremely high gel contamination levels are obtained beginning with run #3. This increases when maximum tube boiling is reached in run #4. During these runs a high degree of oxidation in both large and small pellets may be observed. This oxidation turns the pellets and film gray. Microscopy of the gels and particles shows high concentrations of severely oxidized, crosslinked polymer typical of surfaces in the devolatilization system. Such material requires longer periods of time to form and is likely not produced by the boiling heat transfer. Rather, the degraded polymer may originate from dislodged long-term buildup in the exchanger tube walls by the vigorous percolation effect of boiling. Gels decrease during run #4 and following. This suggests that the boiling action may clean the exchanger. Run #7, which is a repeat of run #4, also results in a high level of gel.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

The invention claimed is:

1. A reaction process comprising:
   (1) reacting a mixture via a reaction to form at least one product comprising:
      (a) an ethylene/α-olefin multiblock interpolymer comprising at least 50 mole percent ethylene which is characterized before any crosslinking by one or more of the following characteristics:
         (1) an average block index greater than zero and up to about 1.0 and a molecular weight distribution, Mw/Mn, greater than about 1.3; or
         (2) at least one molecular fraction which elutes between 40° C. and 130° C. when fractionated using TREF, characterized in that the fraction has a block index of at least 0.5 and up to about 1; or
         (3) an Mw/Mn from about 1.7 to about 3.5, at least one melting point, Tm, in degrees Celsius, and a density, d, in grams/cubic centimeter, wherein the numerical values of Tm and d correspond to the relationship:

$T_m > -6553.3 + 13735(d) - 7051.7(d)^2$; or (4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C.

for ΔH greater than 130 J/g,
         wherein the CRYSTAF peak is determined using at least 5 percent of the cumulative polymer, and if less than 5 percent of the polymer has an identifiable CRYSTAF peak, then the CRYSTAF temperature is 30° C.; or
         (5) an elastic recovery, Re, in percent at 300 percent strain and 1 cycle measured with a compression-molded film of the ethylene/α-olefin multiblock interpolymer, and has a density, d, in grams/cubic centimeter, wherein the numerical values of Re and d satisfy the following relationship when ethylene/α-olefin multiblock interpolymer is substantially free of a cross-linked phase:

$Re > 1481 - 1629(d)$; or (6) has a comonomer content of a TREF fraction which elutes between 40° C. and 130° C. greater than or equal to the quantity (0.2013)T+21.07, where T is the numerical value of the peak ATREF elution temperature of the TREF fraction, measured in ° C.; or
         (7) a storage modulus at 25° C., G'(25° C.), and a storage modulus at 100° C., G'(100° C.), wherein the ratio of G'(25° C.) to G'(100° C.) is in the range of about 1:1 to about 9:1; and
      (b) a metal alkyl compound, a metal oxide, or a mixture thereof; and
   (2) deactivating any catalyst in the at least one product; and
   (3) passing said at least one product to at least one post-reactor heat exchanger;
   wherein the process comprises, after the step (2) of deactivating any catalyst and prior to step (3), the following steps:

(i) optionally, adding a soluble carboxylic acid to the at least one product to react said metal alkyl compound with the soluble carboxylic acid to produce a soluble complex metal ester;
(ii) adding calcium stearate to the at least one product in a ratio of calcium stearate to metal in the at least one product of from about 1.5:1 to about 3:1 on a mass basis; and
(iii) adding a mixture comprising an antioxidant to the at least one product at a temperature of from 120° C. to 200° C. to avoid formation of significant amounts of insoluble metal or metal compounds derived from said metal alkyl compound, wherein the antioxidant is selected from the group consisting of di-octadecyl-3,5-di-tert-butyl-4-hydroxyhydrocinnamate; benzenepropanoic acid; pentaerythritol tetrakis(3-(3,5-di-tert-butyl-4-hydroxyphenyl)propionate); tertiary butyl phenyl phosphate; and mixtures thereof;
wherein, performing the steps (i), (ii) or (iii) results in the at least one product characterized by a whiteness index of above 50.

2. The reaction process of claim 1 wherein step (i) is performed and soluble carboxylic acid of (i) is a saturated or unsaturated aliphatic carboxylic acid having from about 6 to about 20 carbon atoms.

3. The reaction process of claim 2 wherein the soluble carboxylic acid of (i) is stearic acid, octanoic acid, or a mixture thereof.

4. The reaction process of claim 1 wherein step (i) is performed and soluble complex metal ester of (i) is a substituted or unsubstituted aliphatic metal ester comprising from about 6 to about 30 carbon atoms wherein the metal of the metal alkyl compound is a transition metal, a Group IIIA metal, or a combination thereof.

5. The reaction process of claim 4 wherein the metal of the metal alkyl compound is selected from the group consisting of zinc, aluminum, and gallium.

6. The reaction process of claim 1 wherein step (i) is performed and resulting soluble complex metal ester of (i) is a metal ester having the formula $Zn_4O(C_nH_{2n+1}CO_2)_6$ wherein n is from about 5 to about 20.

7. The reaction process of claim 1 wherein step (i) is performed and soluble carboxylic acid of (i) is mixed with water before reacting the soluble carboxylic acid with the metal alkyl compound.

8. The reaction process of claim 1 wherein the calcium stearate of (ii) is mixed with an antistatic agent.

9. A reaction process comprising:
(1) reacting a mixture via a reaction to form at least one product comprising:
(a) an ethylene/α-olefin multiblock interpolymer comprising at least 50 mole percent ethylene which is characterized before any crosslinking by one or more of the following characteristics:
(1) an average block index greater than zero and up to about 1.0 and a molecular weight distribution, Mw/Mn, greater than about 1.3; or
(2) at least one molecular fraction which elutes between 40° C. and 130° C. when fractionated using TREF, characterized in that the fraction has a block index of at least 0.5 and up to about 1; or
(3) an Mw/Mn from about 1.7 to about 3.5, at least one melting point, Tm, in degrees Celsius, and a density, d, in grams/cubic centimeter, wherein the numerical values of Tm and d correspond to the relationship:

$T_m > -6553.3 + 13735(d) - 7051.7(d)^2$; or (4) an Mw/Mn from about 1.7 to about 3.5, and a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 j/g, $\Delta T \geq 48°$ C.

for ΔH greater than 130 J/g,
wherein the CRYSTAF peak is determined using at least 5 percent of the cumulative polymer, and if less than 5 percent of the polymer has an identifiable CRYSTAF peak, then the CRYSTAF temperature is 30° C.; or
(5) an elastic recovery, Re, in percent at 300 percent strain and 1 cycle measured with a compression-molded film of the ethylene/α-olefin multiblock interpolymer, and has a density, d, in grams/cubic centimeter, wherein the numerical values of Re and d satisfy the following relationship when ethylene/α-olefin multiblock interpolymer is substantially free of a cross-linked phase:

$Re > 1481 - 1629(d)$; or (6) has a comonomer content of a TREF fraction which elutes between 40° C. and 130° C. greater than or equal to the quantity (0.2013)T+21.07, where T is the numerical value of the peak ATREF elution temperature of the TREF fraction, measured in ° C.; or
(7) a storage modulus at 25° C., G'(25° C.), and a storage modulus at 100° C., G'(100° C.), wherein the ratio of G'(25° C.) to G'(100° C.) is in the range of about 1:1 to about 9:1; and
(b) a metal alkyl compound, a metal oxide, or a mixture thereof; and
(2) deactivating any catalyst in the at least one product; and
(3) passing said at least one product to at least one post-reactor heat exchanger;
wherein the process comprises, after the step (2) of deactivating any catalyst and prior to step (3), the following steps:
(i) optionally, adding a soluble carboxylic acid to the at least one product to react said metal alkyl compound with the soluble carboxylic acid to produce a soluble complex metal ester;
(ii) adding an ionic surfactant to the at least one product, wherein the ionic surfactant is mixed with an antistatic agent that is an alkoxylated alkylamine;
(iii) optionally, adding a mixture comprising an antioxidant to the at least one product at a temperature of from 120° C. to 200° C. to avoid formation of significant amounts of insoluble metal or metal compounds derived from said metal alkyl compound; and
wherein, performing one or more of the steps (i), (ii) or (iii) results in the at least one product characterized by a whiteness index of above 50.

10. The reaction process of claim 1 wherein the mixture comprising an antioxidant comprises a color stabilizer, a catalyst deactivator, a solvent, or a mixture thereof.

11. The reaction process of claim 1 wherein the mixture comprising an antioxidant comprises water having a temperature of at least 50° C., an alcohol, or a mixture thereof.

12. The reaction process of claim 1 wherein step (i) is performed and molar ratio of the soluble carboxylic acid of (i) to metal in the at least one product is from 1:1 to 10:1.

13. The reaction process of claim 1 wherein performing one or more of the steps (i), (ii) or (iii) results in the post-reactor heat exchanger having a reduced fouling level compared to the fouling level resulting from an identical process performed without one or more of the steps (i), (ii) or (iii).

* * * * *